United States Patent
Park et al.

(10) Patent No.: US 11,258,313 B2
(45) Date of Patent: Feb. 22, 2022

(54) WIRELESS POWER TRANSFER APPARATUS AND METHOD OF CONTROLLING THE SAME

(71) Applicant: LG ELECTRONICS INC., Seoul (KR)

(72) Inventors: Joonho Park, Seoul (KR); Seonghun Lee, Seoul (KR); Bongsik Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/793,946

(22) Filed: Feb. 18, 2020

(65) Prior Publication Data
US 2020/0295606 A1    Sep. 17, 2020

(30) Foreign Application Priority Data
Feb. 19, 2019    (KR) .......................... 10-2019-0019329

(51) Int. Cl.
*H02J 50/90* (2016.01)
*H02J 50/80* (2016.01)
*H02J 50/10* (2016.01)
*H02J 50/40* (2016.01)
*H01F 27/28* (2006.01)
(Continued)

(52) U.S. Cl.
CPC .............. *H02J 50/90* (2016.02); *H01F 27/28* (2013.01); *H01F 38/14* (2013.01); *H02J 7/00032* (2020.01); *H02J 50/10* (2016.02); *H02J 50/40* (2016.02); *H02J 50/80* (2016.02)

(58) Field of Classification Search
CPC .. H02J 50/90; H02J 50/80; H02J 50/10; H02J 50/40; H02J 7/00032; H02J 7/0047; H02J 50/402; H02J 50/12; H02J 50/70; H02J 50/60; H01F 27/28; H01F 38/14; H04B 5/0087; H04B 5/0037
See application file for complete search history.

(56) References Cited

U.S. PATENT DOCUMENTS

2015/0280442 A1    10/2015  Graham
2016/0072334 A1*   3/2016   Wu .......................... H02J 7/025
                                                            320/108

(Continued)

FOREIGN PATENT DOCUMENTS

JP    2006-149168 A    6/2006
JP    2009-271846 A    11/2009
(Continued)

*Primary Examiner* — John W Poos
*Assistant Examiner* — Alex W Lam
(74) *Attorney, Agent, or Firm* — Birch, Stewart, Kolasch & Birch, LLP

(57) ABSTRACT

Disclosed are a wireless power transfer apparatus and a method of controlling the same. The wireless power transfer apparatus in one example can include a power transmission circuit including a plurality of coils and configured to transfer power through the plurality of coils, and a controller, wherein the controller is configured to calculate a data value of a coil with respect to each of the plurality of coils, and determine a position of an object in a charge region corresponding to the plurality of coils in a charge region based on a comparison result obtained by comparing the data value calculated for each of the plurality of coils.

11 Claims, 16 Drawing Sheets

(51) Int. Cl.
*H01F 38/14* (2006.01)
*H02J 7/00* (2006.01)

(56) References Cited

U.S. PATENT DOCUMENTS

2017/0133881 A1\* 5/2017 Cho ..................... H02J 7/0042
2018/0102668 A1\* 4/2018 Hong ..................... H02J 50/12
2018/0337557 A1 11/2018 Chen et al.
2019/0074722 A1\* 3/2019 Shahsavari ............. H02J 7/025

FOREIGN PATENT DOCUMENTS

| | | |
|---|---|---|
| JP | 2010-206865 A | 9/2010 |
| JP | 2011-244624 A | 12/2011 |
| JP | 2013-27074 A | 2/2013 |
| JP | 2013-99249 A | 5/2013 |
| JP | 2013-188071 A | 9/2013 |
| JP | 2014-518502 A | 7/2014 |
| JP | 2015-211538 A | 11/2015 |
| KR | 10-2014-0142139 A | 12/2014 |
| KR | 10-2017-0054708 A | 5/2017 |

\* cited by examiner

180

180

WIRELESS POWER TRANSFER APPARATUS AND METHOD OF CONTROLLING THE SAME

CROSS-REFERENCE TO RELATED APPLICATION

This application claims the priority benefit of Korean Patent Application No. 10-2019-0019329, filed on Feb. 19, 2019 in the Korean Intellectual Property Office, the disclosure of which is expressly incorporated herein by reference into the present application.

BACKGROUND OF THE INVENTION

1. Field of the Invention

The present disclosure relates to a wireless power transfer apparatus and a method of controlling the same, and more particularly, to a wireless power transfer apparatus and a method of controlling the same for more accurately determining a position of an object that is a target of wireless power transfer.

2. Description of the Related Art

In general, when power is supplied to an electronic device, a terminal supply method of supplying commercial power by connecting a physical cable or wire to the electronic device is used. The terminal supply method is disadvantageous in that cables or wires occupy a significant space and are not easily arranged, and there is a risk of short-circuit.

Recently, in order to overcome the problems, research has been conducted into a wireless power transfer method.

A wireless power transfer system includes a wireless power transfer apparatus for supplying power through a single coil or a multi coil, and a wireless power reception apparatus for wirelessly receiving power supplied from the wireless power transfer apparatus and using the received power.

As a wireless power supply method, an inductive coupling method is mainly used, and the method uses a principle whereby a magnetic field is changed by current flowing in a primary coil of two adjacent coils when intensity of the current is changed, and thus magnetic flux through a secondary coil is changed and induced electromotive force is generated at the secondary coil. That is, when this method is used, if only current of the primary coil is changed while the two coils are spaced apart from each other without being spatially moved, the induced electromotive force is generated.

The induced electromotive force generated at the secondary coil is changed depending on arrangement of the primary coil and the secondary coil, and thus power transfer efficiency is also changed. Thus, a position of the secondary coil with respect to the primary coil needs to be accurately determined, and information on the position of the secondary coil and a position with high transfer efficiency needs to be intuitively provided to a user.

SUMMARY OF THE INVENTION

Therefore, the present disclosure has been made in view of the above problems, and it is an object of the present disclosure to provide a wireless power transfer apparatus and a method of controlling the same for accurately determining a position of an object that is a target of wireless power transfer in a charge region corresponding to a plurality of coils.

In accordance with the present disclosure, the above and other objects can be accomplished by the provision of a wireless power transfer apparatus that includes a plurality of coils, calculates various data values for each of the plurality of coils, and accurately determines a position of an object that is a target of wireless power transfer in a charge region based on a comparison result obtained by comparing the calculated data values with a preset reference value.

In accordance with an aspect of the present disclosure, the above and other objects can be accomplished by the provision of a wireless power transfer apparatus including a power transmitter including a plurality of coils and configured to transfer power through the plurality of coils, and a controller, wherein the controller is configured to calculate a data value of a coil with respect to each of the plurality of coils, and determine a position of an object in a charge region corresponding to the plurality of coils based on a comparison result obtained by comparing the data value calculated for each of the plurality of coils with a preset reference value.

In accordance with another aspect of the present disclosure, there is provided a method of controlling a wireless power transfer apparatus including a plurality of coils, including calculating a data value of a coil with respect to each of the plurality of coils, and determining a position of an object in a charge region corresponding to the plurality of coils based on a comparison result obtained by comparing the data value calculated for each of the plurality of coils with a preset reference value.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
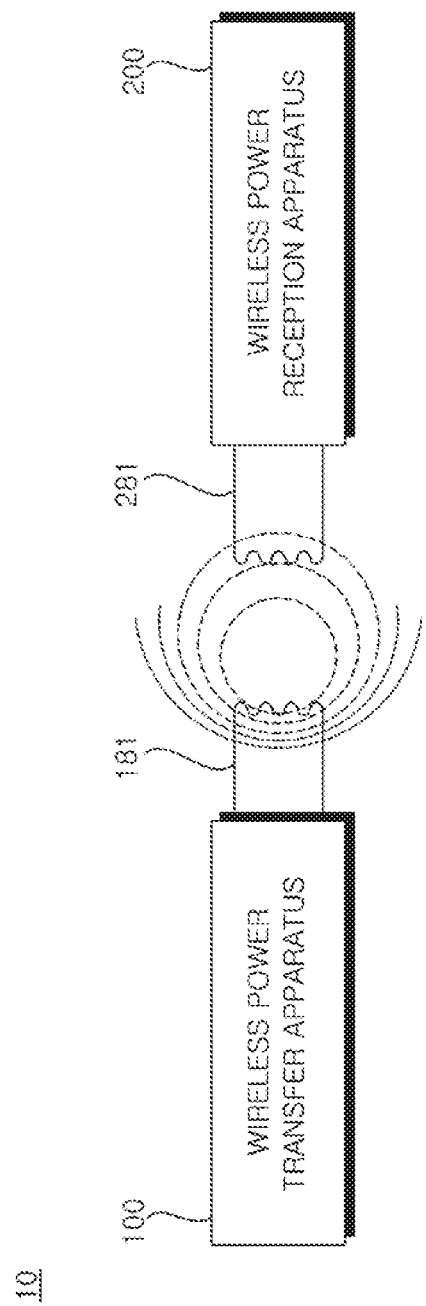
FIG. 1 is a block diagram illustrating a wireless power system according to an embodiment of the present disclosure.

Reference will now be made in detail to the embodiments of the present disclosure, examples of which are illustrated in the accompanying drawings. To clearly and briefly describe the present disclosure, a part without concerning to the description is omitted in the drawings, and the same or like reference numerals in the specification denote the same elements.

The suffixes "module" and "unit" of elements herein are used for convenience of description and thus can be used interchangeably and do not have any distinguishable meanings or functions. Thus, the "module" and the "unit" can be interchangeably used.

Throughout this specification, the terms such as "include" or "comprise" can be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

It will be understood that, although the terms "first", "second", "third" etc. can be used herein to describe various elements, these elements should not be limited by these terms. These terms are only used to distinguish one element from another element.

FIG. 1 is a block diagram illustrating a wireless power system 10 according to an embodiment of the present disclosure.

Referring to FIG. 1, the wireless power system 10 can include, for example, a wireless power transfer apparatus 100 for wirelessly transferring power and a wireless power reception apparatus 200 for receiving the transferred power.

The wireless power transfer apparatus 100 can wirelessly transfer power to the wireless power reception apparatus 200 using a self-induction phenomenon whereby current is induced in a reception coil 281 included in the wireless power reception apparatus 200 along with a change of a magnetic field due to current flowing in, for example, a first coil 181. In this case, the wireless power transfer apparatus 100 and the wireless power reception apparatus 200 can use, for example, a wireless charging method in an electromagnetic induction manner defined in the wireless power consortium (WPC) or power matters alliance (PMA). Alternatively, the wireless power transfer apparatus 100 and the wireless power reception apparatus 200 can use, for example, a wireless charging method in a magnetic resonance manner defined in an alliance for wireless power (A4WP).

According to an embodiment, one wireless power transfer apparatus 100 can transfer power to the plurality of wireless power reception apparatuses 200. In this case, the wireless power transfer apparatus 100 can transfer power to the plurality of wireless power reception apparatuses 200 using, for example, a time division method, but the present disclosure is not limited thereto, and power can also be transferred to the plurality of wireless power reception apparatuses 200 using different frequency bands that are respectively allocated to the plurality of wireless power reception apparatuses 200. The number of the wireless power reception apparatuses 200 for receiving power from one wireless power transfer apparatus 100 can be adaptively determined in consideration of, for example, required electric energy of each of the plurality of wireless power reception apparatuses 200, available electric energy of the wireless power transfer apparatus 100, or the like.

According to another embodiment, the plurality of wireless power transfer apparatuses 100 can transfer power to at least one wireless power reception apparatus 200. In this case, the at least one wireless power reception apparatus 200 can be simultaneously connected to, for example, the plurality of wireless power transfer apparatuses 100 and can simultaneously receive power from the connected wireless power transfer apparatus 100. The number of the wireless power transfer apparatuses 100 can be adaptively determined in consideration of, for example, required electric energy of each of the at least one wireless power reception apparatus 200, available electric energy of the wireless power transfer apparatus 100, or the like.

The wireless power reception apparatus 200 can receive power transferred from, for example, the wireless power transfer apparatus 100.

For example, the wireless power reception apparatus 200 can be an electronic device such as a mobile phone, a laptop computer, a wearable device such as a smart watch, personal digital assistants (PDA), a portable multimedia player (PMP), a navigation device, an MP3 player, an electric toothbrush, an illumination device, or a remote controller, but the present disclosure is not limited thereto, and the wireless power reception apparatus 200 can be any electronic device to be charged by a battery.

The wireless power transfer apparatus 100 and the wireless power reception apparatus 200 may, for example, communicate with each other. In some embodiments, the wireless power transfer apparatus 100 and the wireless power reception apparatus 200 can perform one-way communication or half-duplex communication.

In this case, the communication method can be an in-band communication method using the same frequency band and/or out-of-band communication method using different frequency bands.

Data that is transmitted and received between the wireless power transfer apparatus 100 and the wireless power reception apparatus 200 can include data about the state of a device, data about the amount of electricity used, data about battery charge, data about an output voltage and/or output current of a battery, data related to a control command, or the like.

Figure 2:
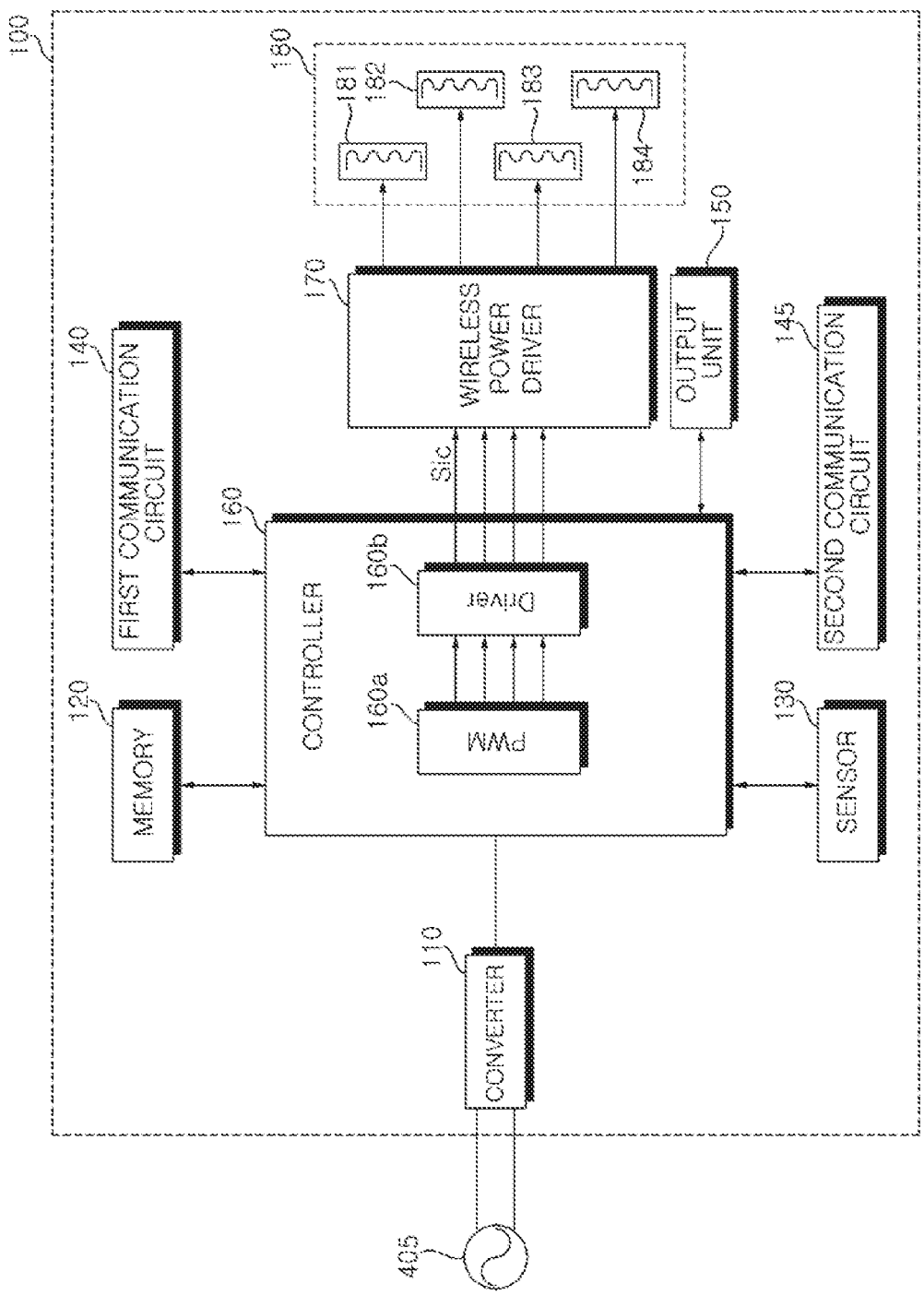
FIG. 2 is an internal block diagram of a wireless power transfer apparatus according to an embodiment of the present disclosure.

FIG. 2 is an internal block diagram of a wireless power transfer apparatus 100 according to an embodiment of the present disclosure.

Referring to FIG. 2, the wireless power transfer apparatus 100 can include, for example, a controller 160 for controlling each of components included in the wireless power transfer apparatus 100, a wireless power driver 170 for converting direct current (DC) power into alternating current (AC) power, and a power transmitter 180 for wirelessly transmitting power using the converted AC power.

The wireless power transfer apparatus 100 can further include, for example, a converter 110 for converting commercial AC power 405 into DC power, a memory 120 for storing control programs for driving the wireless power transfer apparatus 100, a sensor 130 for detecting current and/or voltage input to the components included in the power transmitter 180, and/or first and second communication circuits 140 and 145 that communicate with the wireless power reception apparatus 200 using a predetermined communication method.

The converter 110 can rectify, for example, input AC power into DC power and can output the rectified DC power. In this case, the AC power can be, for example, single phase AC power or three phase AC power. For example, each of the components included in the wireless power transfer apparatus 100 can be operated by DC power output from the converter 110.

Although the commercial AC power 405 is illustrated as single phase AC power in the drawings, the present disclosure is not limited thereto, and the commercial AC power 405 can also be three phase AC power. The internal configuration of the converter 110 can also be changed depending on a type of the commercial AC power 405.

The converter 110 can include, for example, a bridge diode. For example, an upper arm diode device and a lower arm diode device that are connected in series to each other can be configured in a pair, and total of two pairs or three pairs of upper and lower arm diode devices can be connected in parallel to each other. The converter 110 can further include, for example, a plurality of switching devices.

The memory 120 can store various data for an overall operation of the wireless power transfer apparatus 100, for example, a program for processing or controlling the controller 160.

For example, the memory 120 can store data about output intensity of an object detection signal for determining presence of an object positioned in a charge region. Here, the charge region can refer to one region of an external surface of a housing of, for example, the wireless power transfer apparatus 100, which corresponds to a plurality of coils 181 to 184, and the wireless power reception apparatus 200 can contact the charge region or can be positioned within a predetermined distance from the charge region to receive power.

For example, the memory 120 can identify whether an object positioned in the charge region is the wireless power reception apparatus 200 and can store data about output intensity of a reception apparatus detection signal for awaking the wireless power reception apparatus 200.

The data about output intensity of the object detection signal and/or the data about output intensity of the reception apparatus detection signal, which are stored in the memory 120 can include, for example, a factory-calibrated data value.

For example, when at least some of the plurality of coils 181 to 184 overlap each other to form layers, intensities of signals output from the plurality of coils 181 to 184 to the charge region can be different for the respective plurality of coils 181 to 184, and an error can occur due to the difference of signal intensities during determination of whether an object is detected.

According to the present disclosure, in order to overcome the problems, the intensities of signals output from the plurality of coils 181 to 184 can be compensated and set for respective coils in consideration of a distance between the plurality of coils 181 to 184 and the charge region.

For example, as a distance between the charge region and a coil is increased, a signal with higher output intensity can be set to be output. Thus, intensities of signals in the charge region of signals output from the plurality of coils 181 to 184 can be the same.

For example, the memory 120 can store data about a reference value related to a variation of current flowing in the power transmitter 180 according to output of the object detection signal. Here, the reference value can refer to a range of predetermined values.

For example, the memory 120 can store data about a reference value related to a quality factor Q of the plurality of coils 181 to 184.

For example, the memory 120 can store data about a reference value related to signal intensity of a response signal to a reception apparatus detection signal, which is received in response to output of the reception apparatus detection signal.

The data about the reference value related to a variation of current, data about the reference value related to the quality factor Q, and/or data about the reference value related to signal intensity of the response signal, which are stored in the memory 120, can include, for example, a factory-calibrated data value in relation to various positions of the wireless power reception apparatus 200.

For example, the memory 120 can store a variation of current, which is calculated for each of the plurality of coils 181 to 184 in relation to various positions of an object, as a reference value related to the variation of current.

For example, the memory 120 can store a quality factor Q calculated for each of the plurality of coils 181 to 184 in relation to various positions of the wireless power reception apparatus 200, as a reference value related to the quality factor Q.

For example, the memory 120 can store signal intensity of a response signal, which is calculated for each of the plurality of coils 181 to 184 in relation to various positions of the wireless power reception apparatus 200, as a reference value related to signal intensity of a response signal to the reception apparatus detection signal.

For example, the memory 120 can store data about a moving direction corresponding to a position of an object with respect to a charge region.

For example, the memory 120 can also store data about a moving distance corresponding to the position of the object with respect to the charge region. In this case, the memory 120 can store, for example, data about a moving distance corresponding to a variation of current flowing in the plurality of coils 181 to 184, data about a moving distance corresponding to a quality factor Q of the plurality of coils 181 to 184, and/or data about a moving distance corresponding to signal intensity of a response signal to the reception apparatus detection signal, received through the plurality of coils 181 to 184.

Each of the data stored in the memory 120 can also be stored as, for example, a data table about the plurality of coils 181 to 184.

The sensor 130 can detect, for example, current and voltage input to the power transmitter 180, temperature of the plurality of coils 181 to 184, or the like. For example, when the power transmitter 180 includes the plurality of coils 181 to 184 and a plurality of capacitors connected to the plurality of coils 181 to 184, respectively, the sensor 130 can detect all of a voltage V1 applied to opposite ends of the coils and capacitors, and a voltage V2 applied to opposite ends of the coils.

The first and second communication circuits 140 and 145 can communicate with, for example, the wireless power reception apparatus 200.

The first communication circuit 140 can communicate using, for example, a first communication method. The first communication circuit 140 can transmit a signal including data about the state of a device, data about the amount of electricity used, and the like, to the wireless power reception apparatus 200, and can receive a signal including data about the state of the device, data about the amount of electricity used, data about battery charge, and the like, from the wireless power reception apparatus 200.

The second communication circuit 145 can communicate with the wireless power reception apparatus 200 using a second communication method that is different from the first communication method. The second communication circuit 145 can transmit, for example, a signal including data about the state of a device, data about the amount of electricity used, and the like, to the wireless power reception apparatus 200, and can receive a signal including data about the state of a device, data about the amount of electricity used, data about battery charge, and the like, from the wireless power reception apparatus 200.

The first and second communication circuits 140 and 145 can further include a modulator and demodulator for modulating and demodulating, for example, the signal transmitted from the wireless power transfer apparatus 100 and the signal received from the wireless power reception apparatus 200.

The first and second communication circuits 140 and 145 can further include a filter for filtering, for example, the signal received from the wireless power reception apparatus 200. In this case, the filter can include a band pass filter (BPF).

The first communication method can be, for example, an in-band communication method using the same frequency band as the wireless power reception apparatus 200. The second communication method can be, for example, an out-of-band communication method using a different frequency band from the wireless power reception apparatus 200.

A communication method used in the wireless power transfer apparatus 100 can be changed to at least one of the first and second communication methods based on, for example, data about the wireless power reception apparatus 200.

An output unit 150 can include a display device, for example, a display or a light emitting diode (LED) and/or an audio device, for example, a speaker or a buzzer.

The controller 160 can be connected to, for example, components included in the wireless power transfer apparatus 100, and the controller 160 can transmit and receive a signal between the components included in, for example, the wireless power transfer apparatus 100 and can control an overall operation of the components.

The controller 160 can communicate with the wireless power reception apparatus 200 through at least one of, for example, the first and second communication circuits 140 and 145.

The controller 160 can include a pulse width modulation (PWM) generator 160*a* for generating, for example, a PWM signal, and a driver 160*b* for generating a driving signal Sic and outputting the driving signal Sic to the wireless power driver 170 based on the PWM signal.

The wireless power driver 170 can include at least one switching device for converting, for example, DC power into AC power. For example, when the switching device is an IBGT, the driving signal Sic output from the driver 160*b* can be input to a gate terminal of the switching device. The switching device included in the wireless power driver 170 can perform a switching operation according to, for example, the driving signal Sic, and DC power can be converted into AC power and can be output to the power transmitter 180 through the switching operation of the switching device.

The power transmitter 180 can include, for example, the plurality of coils 181 to 184. For example, the plurality of coils 181 to 184 included in the power transmitter 180 can partially overlap each other.

For example, the plurality of coils 181 to 184 can be spaced apart from the reception coil 281 included in the wireless power reception apparatus 200, and thus leakage inductance can be increased and a coupling factor is lowered, thereby lowering transfer efficiency.

To overcome the problem, the power transmitter 180 included in the wireless power transfer apparatus 100 according to various embodiments of the present disclosure can further include, for example, a plurality of capacitor devices that are connected to the plurality of coils 181 to 184, respectively, and can form a resonance circuit with the reception coil 281 included in the wireless power reception apparatus 200.

The plurality of capacitor devices can be connected in series to, for example, the plurality of coils 181 to 184, respectively. In some embodiments, the plurality of capacitor devices can be connected in parallel to the plurality of coils 181 to 184, respectively to form a resonance circuit.

The power transmitter 180 can determine, for example, a resonance frequency for wireless power transfer.

The power transmitter 180 can further include, for example, a shielding material that is disposed at one side of the plurality of coils 181 to 184 and shields a leakage magnetic field.

The controller 160 can transmit and receive, for example, a signal through the plurality of coils 181 to 184 included in the power transmitter 180.

The controller 160 can control each of the components included in the wireless power transfer apparatus 100 to output an object detection signal for determining presence of an object positioned within a charge region through, for example, the plurality of coils 181 to 184. The object detection signal can be, for example, an analog ping (AP) signal with a very short pulse. For example, the controller 160 can output an analog ping (AP) signal through the plurality of coils 181 to 184 in a predetermined order.

The controller 160 can calculate a variation of current flowing in each of the plurality of coils 181 to 184, for example, according to output of the object detection signal. For example, the controller 160 can detect current flowing in each of the plurality of coils 181 to 184 through the sensor 130, and can calculate a variation of current flowing in each of the plurality of coils 181 to 184 based on the detected current.

The controller 160 can determine whether an object is present in the charge region and a position of the object in the charge region based on, for example, a variation of current flowing in each of the plurality of calculated coils 181 to 184.

For example, the controller 160 can compare variations of currents flowing in the plurality of coils 181 to 184 calculated according to output of the analog ping (AP) signal, and can determine whether an object is present in the charge region and a position of the object in the charge region based on the comparison result.

For example, the controller 160 can compare a variation of current flowing in each of the plurality of coils 181 to 184, calculated according to output of the analog ping (AP) signal, with a reference value related to the variation of current, stored in the memory 120, and can determine whether an object is present in the charge region and a position of the object in the charge region based on the comparison result.

A reference value related to a variation of current as a reference for determining whether an object is present in a charge region and a reference value related to a variation of current as a reference for determining whether the object is positioned at a position at which power is not capable of being transferred can be different from each other. For example, when an object is positioned in a region corresponding to any one of the plurality of coils 181 to 184 in the charge region, the reference value related to a variation of current as the reference for determining whether an object is present in the charge region can be a value less than the reference value related to a variation of current as the reference for determining whether the object is positioned at a position at which power is capable of being transferred.

The controller 160 can control each of components included in the wireless power transfer apparatus 100 to output a reception apparatus detection signal for awaking the wireless power reception apparatus 200 through, for example, the plurality of coils 181 to 184. The reception apparatus detection signal can be, for example, a digital ping (DP) signal.

The digital ping (DP) signal can be set to have a higher duty than the analog ping (AP) signal in order to attempt to set communicate with, for example, the wireless power reception apparatus 200.

For example, the controller 160 can output a digital ping (DP) signal through the plurality of coils 181 to 184 in a predetermined order.

The controller 160 can receive a response signal to the reception apparatus detection signal, output from the wireless power reception apparatus 200, through, for example, the plurality of coils 181 to 184. For example, the wireless power reception apparatus 200 can modulate the digital ping (DP) signal and can transmit the modulated digital ping (DP) signal as a response signal to the wireless power transfer apparatus 100.

The controller 160 can determine whether an object positioned in the charge region is the wireless power reception apparatus 200 based on, for example, the response signal to the reception apparatus detection signal. For example, the controller 160 can demodulate the modulated digital ping (DP) signal received as the response signal to acquire digital-form data and can determine whether the object positioned in the charge region is the wireless power reception apparatus 200 based on the acquired data.

The controller 160 can calculate signal intensity of a response signal to, for example, the reception apparatus detection signal with respect to each of the plurality of coils 181 to 184 and can determine a position of an object in the charge region based on the calculated signal intensity of the response signal.

For example, the controller 160 can compare signal intensity of the response signal, calculated for each of the plurality of coils 181 to 184, with a reference value related to signal intensity of the response signal, stored in the memory 120, and can determine a position of an object in the charge region according to the comparison result.

The controller 160 can calculate, for example, a quality factor Q of each of the plurality of coils 181 to 184. For example, the controller 160 can detect a voltage V1 applied to a coil and a capacitor and a voltage V2 applied to opposite ends of the coil through the sensor 130 and can calculate the quality factor Q of each of the plurality of coils 181 to 184 based on the detected voltages.

According to the present disclosure, although the case in which the voltage V1 applied to the coil and the capacitor and the voltage V2 applied to opposite ends of the coil are detected in order to calculate the quality factor Q is described, the present disclosure is not limited thereto, and the voltage V2 applied to the opposite ends of the coil and a voltage V3 applied to opposite ends of the capacitor can also be detected to calculate the quality factor Q.

In detail, the controller 160 can calculate the quality factor Q of each of the plurality of coils 181 to 184 using, for example, Equation 1 below.

$$Q_i = V2/V1 \qquad \text{[Equation 1]}$$

Here, Qi can refer to, for example, a quality factor Q of each of the plurality of coils 181 to 184. For example, a quality factor Q of the first coil 181 can be a value obtained by dividing the voltage V2 applied to the opposite ends of the first coil 181 by the voltage V1 applied to the first coil 181 and the capacitor connected to the first coil 181.

The controller 160 can determine whether an object positioned in the charge region is the wireless power reception apparatus 200 based on, for example, the quality factor Q of each of the plurality of coils 181 to 184.

In detail, when frequency sweep occurs to a high frequency from a low frequency within an operating frequency (or available frequency) band, the voltage V1 applied to the coil and the capacitor may not be generally changed despite frequency sweep but can be slightly reduced at a time point at which an object is present in the charge region. The voltage V2 applied to the opposite ends of the coil can be changed to be gradually increased and then lowered according to, for example, frequency sweep.

The controller 160 can calculate a maximum value of a ratio of the voltage V1 applied to the coil and the capacitor to the voltage V2 applied to the opposite ends of the coil, which is changed according to, for example, frequency sweep, as a quality factor Q of a corresponding coil in a resonance frequency.

The controller 160 can compare, for example, the quality factor Q of the plurality of coils 181 to 184 with a reference value related to the quality factor Q stored in the memory 120 and can determine whether an object positioned in the charge region is the wireless power reception apparatus 200 according to the comparison result. In this case, when determining that the object positioned in the charge region is not the wireless power reception apparatus 200, the controller 160 can determine that the corresponding object is a foreign object (FO).

The controller 160 can compare, for example, total sum of quality factors Q of the plurality of coils 181 to 184 with the reference value related to the quality factor Q stored in the memory 120 and can determine whether the object positioned in the charge region is the wireless power reception apparatus 200 according to the comparison result.

The controller 160 can determine a position of an object in the charge region based on, for example, the quality factor Q of the plurality of coils 181 to 184. For example, the controller 160 can compare the quality factor Q of each of the plurality of coils 181 to 184 with the reference value related to the quality factor Q stored in the memory 120 and can determine a position of an object in the charge region according to the comparison result.

The controller 160 can control, for example, each of the components included in the wireless power transfer apparatus 100 and can transfer power to the wireless power reception apparatus 200 through the power transmitter 180.

The controller 160 can determine a combination of coils including at least one of, for example, the plurality of coils 181 to 184. In addition, the controller 160 can transmit and receive a signal and can wirelessly transmit power through, for example, the determined combination of coils.

Power is transferred according to a combination of coils including at least one of the plurality of coils 181 to 184 included in the power transmitter 180, and thus the power transmitter 180 can be referred to as, for example, a transfer coil unit or a coil unit. Each of the plurality of coils 181 to 184 included in the power transmitter 180 can be referred to as a transfer coil in order to differentiate from, for example, the reception coil 281 included in the wireless power reception apparatus 200.

The controller 160 can output a message through, for example, the output unit 150. For example, the controller 160 can output a message through a display device included in the output unit 150. For example, the controller 160 can output a message through an audio device included in the output unit 150.

The controller 160 can output a message of a moving direction toward a position with higher wireless power transfer efficiency from the current position of an object based on, for example, data about a moving direction corresponding to a position of the object, stored in the memory 120. The controller 160 can output a message of a moving distance toward a position with higher power transfer efficiency from the current position of an object based on, for example, data about a moving distance corresponding to a position of the object, stored in the memory 120. As such, a user can be guided to change a position of an object, thereby increasing power transfer efficiency.

The controller 160 can also stop transferring power based on values detected through, for example, the sensor 130.

Figure 3:
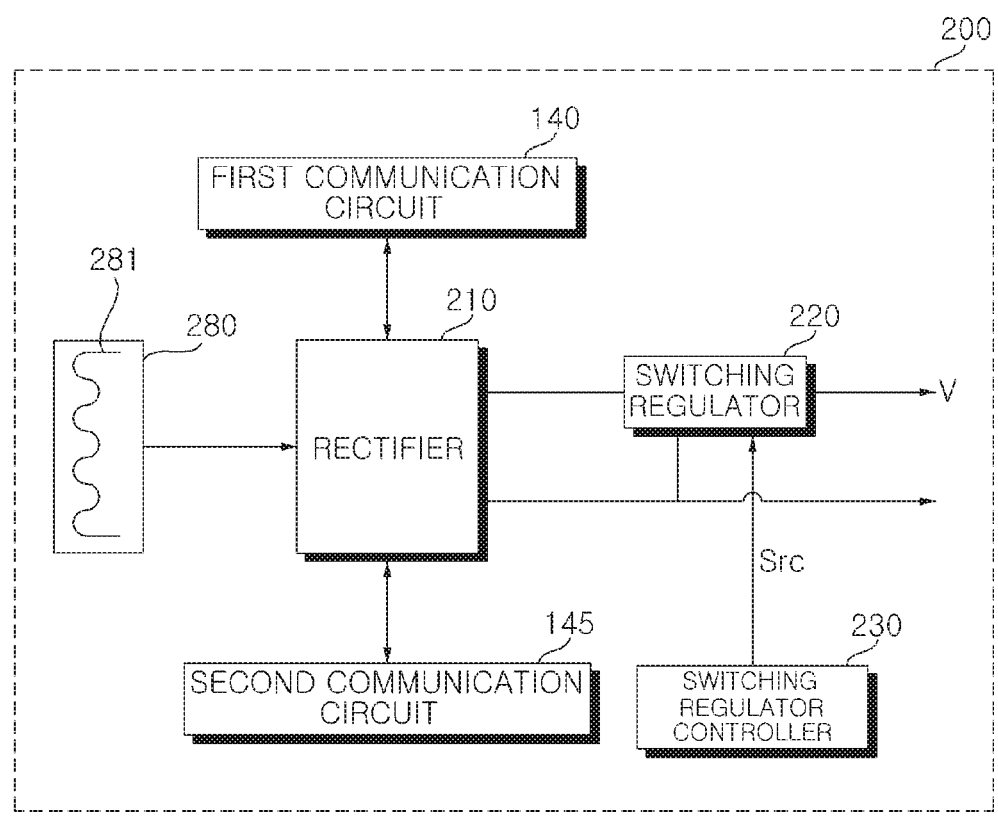
FIG. 3 is an internal block diagram of a wireless power reception apparatus according to an embodiment of the present disclosure.

FIG. 3 is an internal block diagram of a wireless power reception apparatus 200 according to an embodiment of the present disclosure.

Referring to FIG. 3, the wireless power reception apparatus 200 can include, for example, a power receiver 280 for wirelessly receiving power from the wireless power transfer apparatus 100, a rectifier 210 for rectifying the received power, a switching regulator 220 for stabilizing the rectified power, and/or a switching regulator controller 230 for controlling the switching regulator 220 and outputting operating power to a load.

The wireless power reception apparatus 200 can further include, for example, a first communication circuit 240 and a second communication circuit 250 for communicating with the wireless power transfer apparatus 100.

The power receiver 280 can receive power transferred from, for example, the power transmitter 180. To this end, the power receiver 280 can include, for example, at least one reception coil 281. Hereinafter, the reception coil 281 included in the power receiver 280 will be referred to as a reception coil.

The reception coil 281 can generate induced electromotive force by, for example, a magnetic field generated from at least one of the plurality of coils 181 to 184. Power due to induced electromotive force can be supplied to a load through, for example, the rectifier 210 and the switching regulator 220. For example, when the load is a battery, power due to induced electromotive force can be used to charge a battery. According to the present disclosure, although the case in which a load to which power is supplied through the rectifier 210 and the switching regulator 220 is a battery is described, the present disclosure is not limited thereto.

The reception coil 281 can be formed in a thin film-type conductive pattern on, for example, a printed circuit board (PCB). The reception coil 281 can be printed on a pad in the form of, for example, a closed loop. For example, the reception coil 281 can be wound to have polarity in the same direction.

The wireless power reception apparatus 200 can further include, for example, at least one capacitor for forming a resonance circuit with the power transmitter 180 included in the wireless power transfer apparatus 100. In this case, the capacitor can be connected in series or in parallel to, for example, the reception coil 281.

The wireless power reception apparatus 200 can further include, for example, a shielding material that is disposed at one side of the reception coil 281 and shields a leakage magnetic field.

The rectifier 210 can rectify power received through, for example, the reception coil 281. The rectifier 210 can include at least one diode.

The switching regulator 220 can supply the power rectified by the rectifier 210 to a battery under control of, for example, the switching regulator controller 230. For example, the switching regulator 220 can output the power rectified by the rectifier 210 as charging power (v) supplied to a battery.

The switching regulator controller 230 can perform control to output a regulator control signal Src to, for example, the switching regulator 220 and to output the charging power (v) to the battery.

The switching regulator 220 can perform DC-DC converting and can adjust output voltage according to, for example, the regulator control signal Src of the switching regulator controller 230. The switching regulator 220 can output the charging power (v) having a voltage with predetermined amplitude based on, for example, the regulator control signal Src.

The wireless power reception apparatus 200 may not include, for example, a separate processor, and when the rectified charging power (v) is output as a voltage with predetermined amplitude by the switching regulator 220, the switching regulator 220 can be controlled by the switching regulator controller 230. When the wireless power reception apparatus 200 does not include a processor, the hardware configuration can be simplified and power consumption can be reduced.

Figure 4:
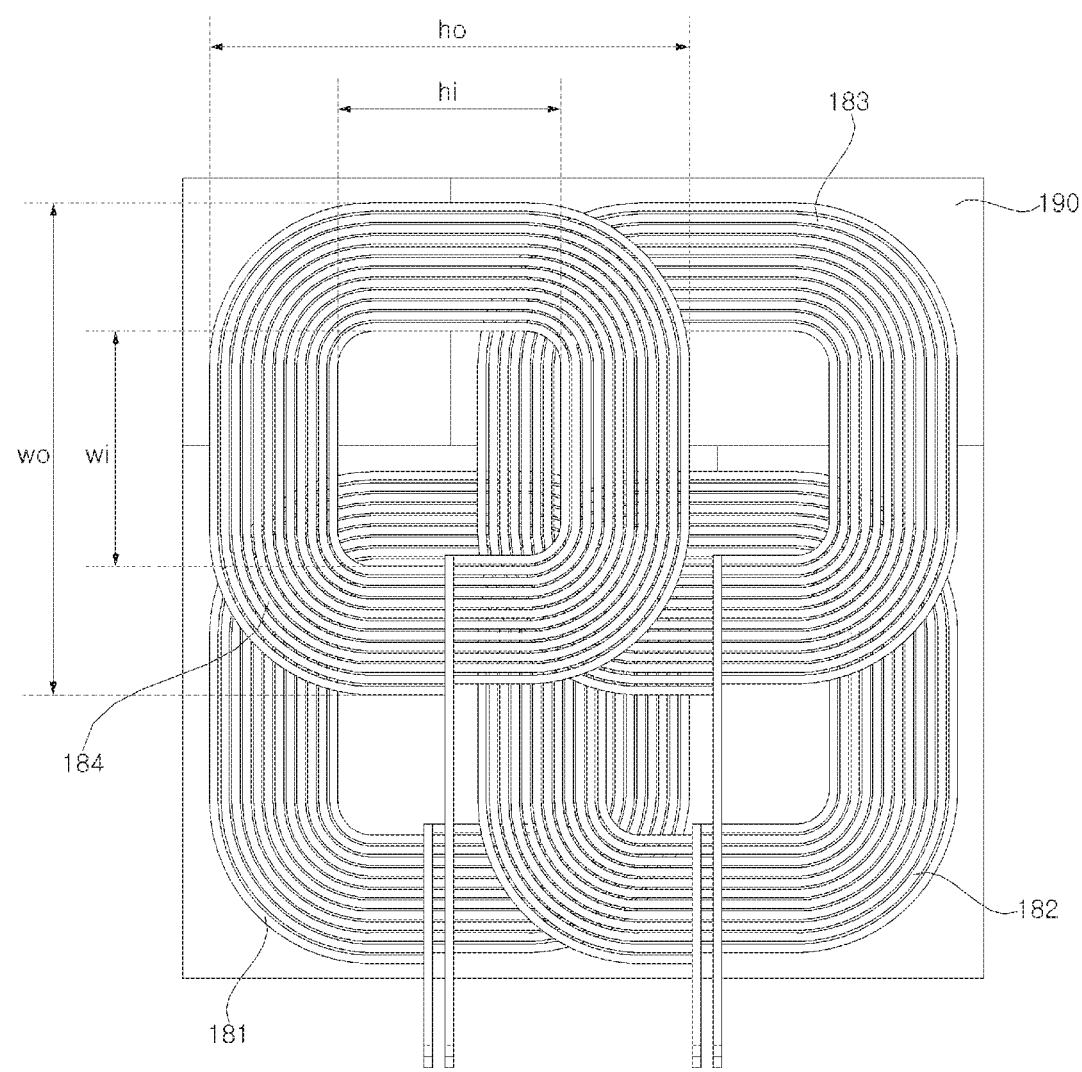
FIG. 4 is a diagram for explaining the configuration of a plurality of coils included in a wireless power transfer apparatus according to an embodiment of the present disclosure.
Figure 5:
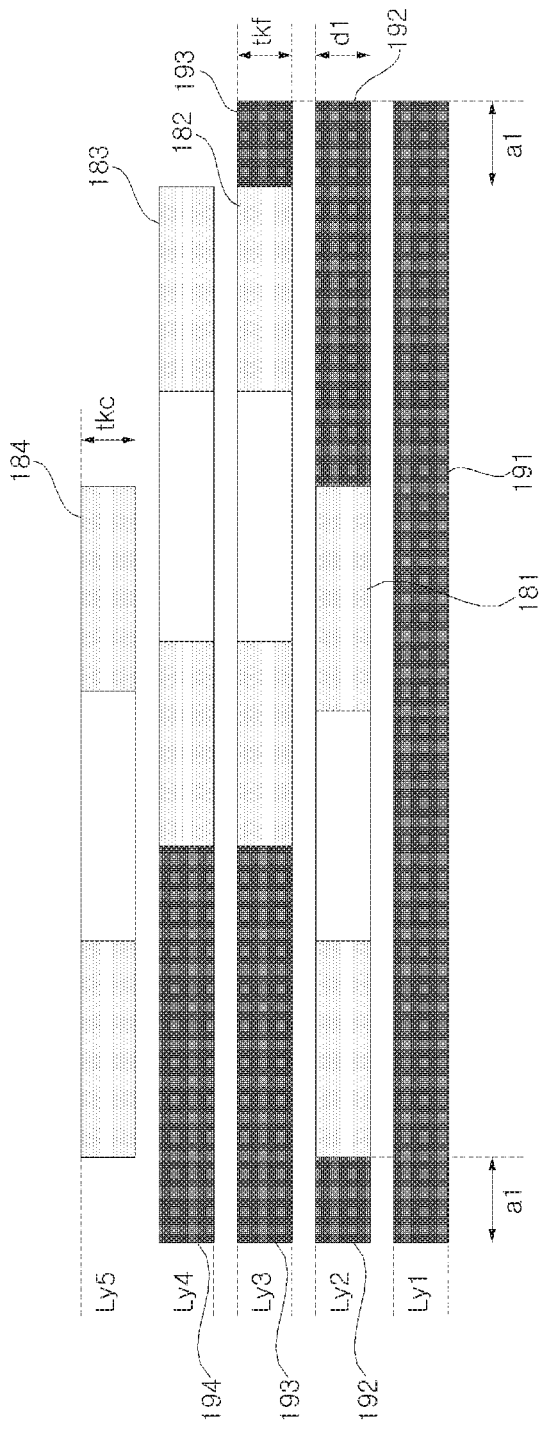
FIG. 5 is a diagram for explaining a hierarchical structure of a plurality of coils included in a wireless power transfer apparatus according to an embodiment of the present disclosure.

FIG. 4 is a diagram for explaining the configuration of a plurality of coils included in a wireless power transfer apparatus according to an embodiment of the present disclosure. FIG. 5 is a diagram for explaining a hierarchical structure of a plurality of coils included in a wireless power transfer apparatus according to an embodiment of the present disclosure.

Referring to FIGS. 4 and 5, the power transmitter 180 according to an embodiment of the present disclosure can include, for example, the first to fourth coils 181 to 184.

The power transmitter 180 includes the first to fourth coils 181 to 184 but not a single large-size coil, and thus, needless to say, a degree of freedom of a charging can be increased, and power efficiency can be prevented from being lowered due to stray magnetic fields of a large-size coil.

For example, the first to fourth coils 181 to 184 can be arranged in such a way that some regions thereof overlap each other. In this case, the first to fourth coils 181 to 184 can be arranged to overlap each other to minimize a dead zone as a region from which power is not transferred to the wireless power reception apparatus 200 in a charge region corresponding to the first to fourth coils 181 to 184. For example, the first to fourth coils 181 to 184 can be arranged to overlap each other to minimize a dead zone of a central portion of the charge region.

The first to fourth coils 181 to 184 can be manufactured with, for example, an outer length ho, an internal length hi, an outer width wo, an internal width wi, a thickness, and the number of coils, which are preset. The first to fourth coils 181 to 184 can have, for example, the same outer length ho, the same internal length hi, the same outer width wo, and the same internal width wi.

Inductance of the fourth coil 184 disposed the most adjacent to the wireless power reception apparatus 200 can be set to be less than inductance of, for example, the first to third coils 181 to 183. As such, power transfer rate or efficiency of the power transmitter 180 can be constant.

The power transmitter 180 can further include, for example, a shielding material 190. The first to fourth coils 181 to 184 can be disposed on, for example, the shielding material 190. The shielding material 190 can include ferrite including a combination of one or two elements or more selected from the group consisting of cobalt (Co), iron (Fe), nickel (Ni), boron (B), or silicon (Si). The shielding material 190 can be disposed at, for example, one side of a coil, can shield a leakage magnetic field, and can maximize the directivity of a magnetic field.

For example, an area of the shielding material 190 can be larger than an area in which the first to fourth coils 181 to 184 are arranged. For example, as shown in FIGS. 4 and 5, the shielding material 190 can be formed to extend at an interval a1 from a horizontal outer side of the first to fourth coils 181 to 184. For example, the shielding material 190 can be formed to extend at an interval a1 from a vertical outer side of the first to fourth coils 181 to 184.

The shielding material 190 can be formed to be larger than the outer length of the first to fourth coils 181 to 184, thereby reducing a leakage magnetic field and maximizing the directivity of a magnetic field.

The first to fourth coils 181 to 184 can be arranged in such a way that some regions thereof overlap each other, and thus regions that do not overlap each other can be separated. For example, as shown in FIG. 5, only some regions of the first coil 181 and second coil 182 overlap each other, and thus regions that do not overlap each other can be spaced by a distance d1.

Due to the distance d1, a leaking magnetic field of the second coil 182 may not be shielded, and thus, transfer efficiency of the wireless power transfer apparatus 100 can be reduced and a direction of a magnetic field can also be dispersed. Due to the distance, the wireless power transfer apparatus 100 can be easily damaged by external shocks.

According to the present disclosure, in order to overcome the problems, the first to fourth coils 181 to 184 and the shielding material 190 can be formed to configure layers.

In more detail, for example, a base shielding material 191 can be disposed on a first layer ly1 of the power transmitter 180.

For example, the first coil 181 and a first shielding material 192 can be disposed on a second layer ly2 that is an upper side of the base shielding material 191.

For example, the second coil 182 that partially overlap the first coil 181 can be disposed on a third layer ly3 that is an upper side of the first coil 181. In this case, the first shielding material 192 disposed on the second layer ly2 can prevent separation between the first coil 181 and the second coil 182, which occurs due to an overlapping structure of the first coil 181 and the second coil 182.

According to the same principle, for example, a second shielding material 193 as well as the second coil 182 can be disposed on the third layer ly3 of the power transmitter 180.

For example, the third coil 183 that partially overlap the second coil 182 can be disposed on a fourth layer ly4 that is an upper side of the second coil 182. In this case, the second shielding material 193 disposed on the third layer ly3 can prevent separation between the second coil 182 and the third coil 183, which occurs due to an overlapping structure of the second coil 182 and the third coil 183.

For example, a third shielding material 194 as well as the third coil 183 can be disposed on the fourth layer ly4 of the power transmitter 180, and the third shielding material 194 can prevent separation between the third coil 183 and the fourth coil 184, which occurs due to an overlapping structure of the third coil 183 and the fourth coil 184.

The first to fourth coils 181 to 184 need to be adhered to the shielding material 190 (the base shielding material 191 and the first to third shielding materials 192 to 194) without separation, and thus, the thickness of the shielding material can be a predetermined thickness tkf that is the same as the thickness of, for example, the first to fourth coils 181 to 184.

Although FIG. 5 illustrates the case in which layers of the power transmitter 180 are spaced apart from each other, this is for convenience of description, and thus, the layers of the power transmitter 180 can be held close to each other.

As shown in FIG. 5, while the power transmitter 180 is disposed, the first to fourth coils 181 to 184 that partially overlap each other can be prevented from being separated, and the first to fourth coils 181 to 184 can be prevented from being separated from external shocks.

The shielding material 190 is disposed at one side of each coil, and thus, a leakage magnetic field can be shielded, and the directivity of a magnetic field can be further focused, thereby increasing transfer efficiency.

The shielding material 190 is disposed between coils, and thus heat generated from a multi coil can be more easily reduced.

The first to fourth coils 181 to 184 can be accommodated in a case that is not illustrated for convenience of description. For example, the wireless power reception apparatus 200 can be positioned on one lateral surface of the case. When the wireless power reception apparatus 200 is positioned on one lateral surface of the case, the power transmitter 180 can wirelessly transfer power to charge the wireless power reception apparatus 200, and thus, the one lateral surface on which the wireless power reception apparatus 200 is positioned can be referred to as a charging surface. In addition, the charging surface and an interface surface can be interchangeably used.

Figure 6:
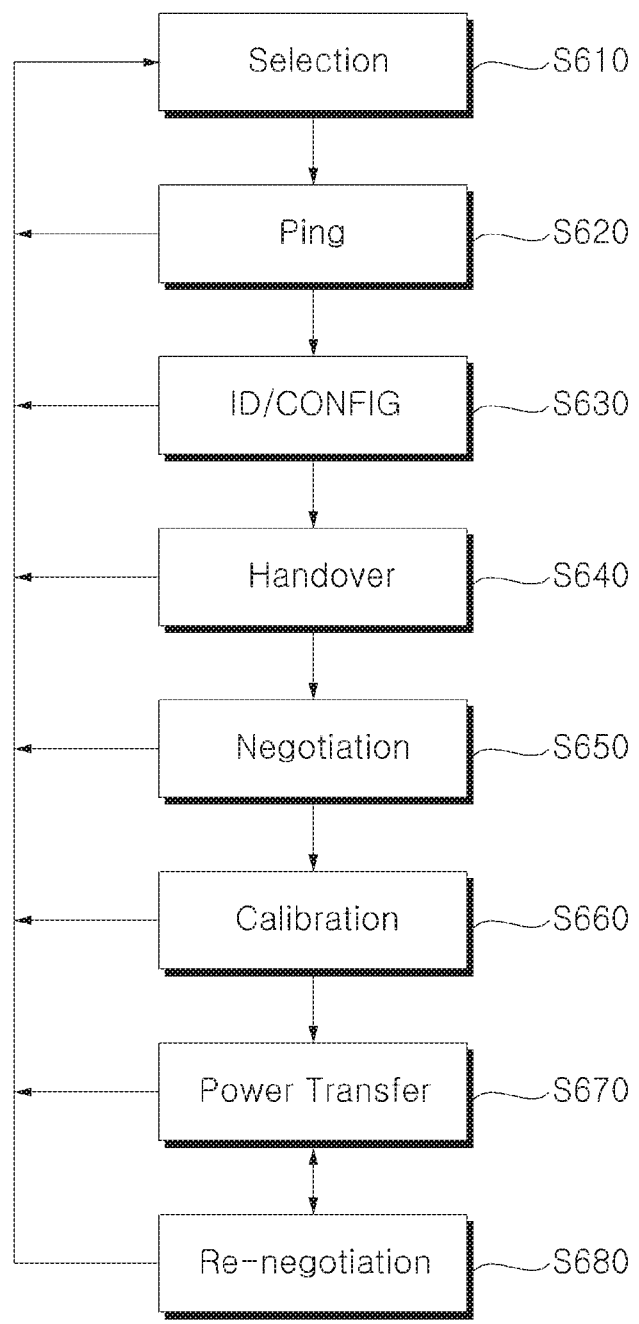
FIG. 6 is a flowchart of a wireless power transfer method of a wireless power transfer apparatus according to an embodiment of the present disclosure.

FIG. 6 is a flowchart of a wireless power transfer method of a wireless power transfer apparatus according to an embodiment of the present disclosure.

Referring to FIG. 6, the wireless power transfer method can include a selection phase S610, a ping phase S620, an identification and configuration phase S630, a handover phase S640, a negotiation phase S650, a calibration phase S660, a power transfer phase S670, and a re-negotiation phase S680.

First, in the selection phase S610, the wireless power transfer apparatus 100 can determine, for example, whether an object is present in a charge region.

In order to determine, for example, whether an object is present in the charge region, the wireless power transfer apparatus 100 can output an object detection signal (e.g., an analog ping (AP) signal) and can determine whether an object is present in the charge region based on output of the object detection signal.

The wireless power transfer apparatus 100 can output an object detection signal with a predetermined period, for example, until determining the object to be present in the charge region.

The wireless power transfer apparatus 100 can output the object detection signal in a predetermined order through, for example, the plurality of coils 181 to 184 and can determine whether an object is present in the charge region based on a variation of current flowing in each of the plurality of coils 181 to 184.

For example, the wireless power transfer apparatus 100 can compare a variation of current flowing in each of the plurality of coils 181 to 184 with a preset reference value and can determine the object to be positioned in a region corresponding to a coil in which a current variation equal to or greater than the preset reference value is calculated among the plurality of coils 181 to 184. In this case, the coil in which the current variation equal to or greater than the preset reference value can be referred to as an active coil.

In the selection phase S610, the wireless power transfer apparatus 100 can determine, for example, whether a foreign object FO is present in the charge region. The foreign object FO can be a metallic object such as a coin or a key.

In the selection phase S610, the wireless power transfer apparatus 100 can continuously detect, for example, arrangement or removal of an object in the charge region.

In the selection phase S610, when determining that the object is present in the charge region, the wireless power transfer apparatus 100 can perform the selection phase S620.

In the selection phase S620, the wireless power transfer apparatus 100 can identify, for example, whether the object positioned in the charge region is the wireless power reception apparatus 200 and can transmit a reception apparatus detection signal (e.g., a digital ping (DP) signal) for awaking the wireless power reception apparatus 200.

The wireless power transfer apparatus 100 can receive, for example, a response signal to the reception apparatus detection signal. For example, the wireless power reception apparatus 200 can modulate a digital ping (DP) signal and can transmit the modulated digital ping (DP) signal as a response signal to the wireless power transfer apparatus 100.

The wireless power transfer apparatus 100 can determine whether the object positioned in the charge region is the wireless power reception apparatus 200 based on, for example, a response signal to the reception apparatus detection signal. For example, the wireless power transfer apparatus 100 can demodulate the modulated digital ping (DP) signal received as the response signal to acquire digital-form data and can determine whether the object positioned in the charge region is the wireless power reception apparatus 200 based on the acquired data.

In the selection phase S620, when the object positioned in the charge region is determined to be the wireless power reception apparatus 200, the identification and configuration phase S630 can be performed.

In the selection phase S620, when a response signal is not received, the wireless power transfer apparatus 100 can proceed to the selection phase S610 and can perform each operation of the selection phase S610.

In the identification and configuration phase S630, the wireless power transfer apparatus 100 can control each component included therein to effectively transfer power based on, for example, data received from the wireless power reception apparatus 200.

In the identification and configuration phase S630, the wireless power transfer apparatus 100 can receive identification data from, for example, the wireless power reception apparatus 200. The identification data can include, for example, data about a version of a wireless power transfer rule, data about a manufacturer of the wireless power reception apparatus 200, a device identifier, or data indicating whether an expansion device identifier is present.

In the identification and configuration phase S630, the wireless power transfer apparatus 100 can receive power data from, for example, the wireless power reception apparatus 200. The power data can include, for example, data about maximum power of the wireless power reception apparatus 200, data about remaining power, or data about a power class.

The wireless power transfer apparatus 100 can identify the wireless power reception apparatus 200 and can check the state of power of the wireless power reception apparatus 200 based on, for example, the identification data and the power data.

In the identification and configuration phase S630, when the wireless power transfer apparatus 100 identifies the wireless power reception apparatus 200 and checks the state of power of the wireless power reception apparatus 200, the handover phase S640 can be performed.

In the identification and configuration phase S630, when the wireless power transfer apparatus 100 does not receive identification data and/or power data, the wireless power transfer apparatus 100 can proceed to the selection phase S610.

In the handover phase S640, the wireless power transfer apparatus 100 can determine, for example, whether a communication method with the wireless power reception apparatus 200 is changed.

For example, in a state in which the wireless power transfer apparatus 100 communicates with the wireless power reception apparatus 200 using an in-band communication method, the wireless power transfer apparatus 100 can determine whether the in-band communication method is maintained or whether the in-band communication method is changed to an out-of-band communication method based on the power data of the wireless power reception apparatus 200 acquired in the identification and configuration phase S630.

The wireless power transfer apparatus 100 can determine whether entry into the negotiation phase S650 is required based on, for example, a negotiation field value received in the identification and configuration phase S630 or the handover phase S640.

For example, when entry into the negotiation phase S650 is required, the wireless power transfer apparatus 100 can perform a foreign object detection (FOD) operation in the negotiation phase S650.

The wireless power transfer apparatus 100 can determine whether the calibration phase S660 is performed based on, for example, whether the foreign object FO is present in the charge region, which is determined in the selection phase S610 and/or the negotiation phase S650.

For example, when entry into the negotiation phase S650 is not required, the wireless power transfer apparatus 100 can perform the power transfer phase S670.

When the foreign object FO is not detected in, for example, the selection phase S610 and/or the negotiation phase S650, the wireless power transfer apparatus 100 can perform the power transfer phase S670 through the calibration phase S660.

When the foreign object FO is detected in, for example, the selection phase S610 and/or the negotiation phase S650, the wireless power transfer apparatus 100 can proceed to the selection phase S610 without power transfer.

In the calibration phase S660, the wireless power transfer apparatus 100 can calculate power loss based on, for example, a difference between transferred power of the wireless power transfer apparatus 100 and received power of the wireless power reception apparatus 200.

In the power transfer phase S670, the wireless power transfer apparatus 100 can transfer power to, for example, the wireless power reception apparatus 200.

In the power transfer phase S670, when receiving data related to power control from the wireless power reception apparatus 200, for example, during power transfer, the wireless power transfer apparatus 100 can determine the characteristics of power based on data related to control of received power.

In the power transfer phase S670, the wireless power transfer apparatus 100 proceeds to the selection phase S610, for example, when unexpected data is received, when expected data, e.g., data related to power control is not received for a preset time (time out), when preset power transfer contract violation occurs, or when charging is completed.

In the power transfer phase S670, the wireless power transfer apparatus 100 can perform the re-negotiation phase S680, for example, when power transfer negotiation needs to be reconfigured according to a change in the state of the wireless power transfer apparatus 100 and/or the wireless power reception apparatus 200, or the like. In this case, when renegotiation is normally completed, the wireless power transfer apparatus 100 can return to the power transfer phase S670.

Figure 7:
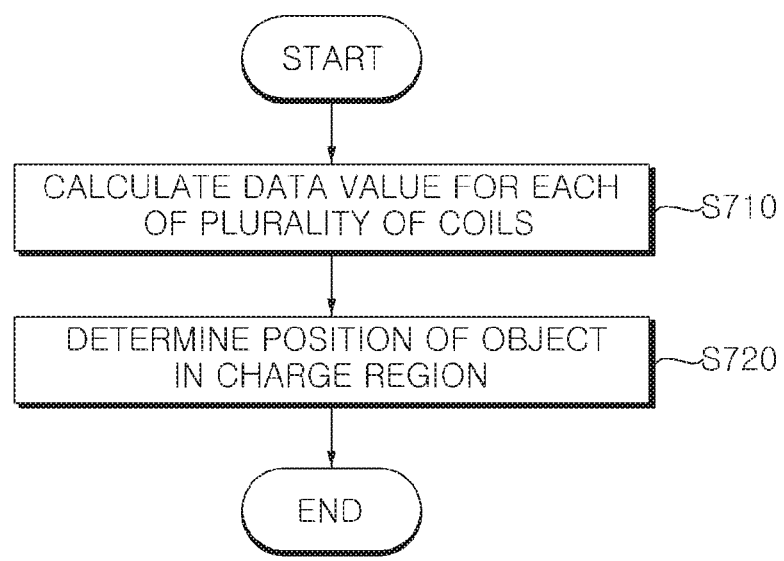
FIG. 7 is a flowchart of a method of controlling a wireless power transfer apparatus according to an embodiment of the present disclosure.

FIG. 7 is a flowchart of a method of controlling a wireless power transfer apparatus according to an embodiment of the present disclosure.

Referring to FIG. 7, in operation S710, the wireless power transfer apparatus 100 can calculate a data value of each of the plurality of coils 181 to 184.

For example, the wireless power transfer apparatus 100 can output an object detection signal for determining whether an object positioned in the charge region is present through the plurality of coils 181 to 184 and can calculate a variation of current of each of the plurality of coils 181 to 184 as a data value according to output of the object detection signal.

For example, the wireless power transfer apparatus 100 can output a reception apparatus detection signal for awaking the wireless power reception apparatus 200 through the plurality of coils 181 to 184 and can receive a response signal to the reception apparatus detection signal. In this case, the wireless power transfer apparatus 100 can calculate signal intensity of a response signal to each of the plurality of coils 181 to 184 as a data value.

For example, the wireless power transfer apparatus 100 can detect a voltage V1 applied to a coil and a capacitor and a voltage V2 applied to opposite ends of the coil and can calculate a quality factor Q of each of the plurality of coils 181 to 184 as a data value based on the detected voltages.

In operation S720, the wireless power transfer apparatus 100 can determine a position of an object, corresponding to each of the plurality of coils 181 to 184 in the charge region. The wireless power transfer apparatus 100 can compare, for example, the data value calculated in operation S710 with a data value stored in the memory 120 and can determine a position of an object in the charge region based on the comparison result.

For example, the wireless power transfer apparatus 100 can compare a variation of current of each of the plurality of coils 181 to 184 according to output of the object detection signal with a reference value related to a variation of current stored in the memory 120 and can determine the position of the charge region according to the comparison result.

For example, the wireless power transfer apparatus 100 can compare signal intensity of the response signal calculated for each of the plurality of coils 181 to 184 with a reference value related to signal intensity of a response signal stored in the memory 120 and can determine a position of an object in the charge region according to the comparison result.

For example, the wireless power transfer apparatus 100 can compare a quality factor Q of each of the plurality of coils 181 to 184 with a reference value related to a quality factor Q stored in the memory 120 and can determine a position of an object in the charge region according to the comparison result.

Figure 8A:
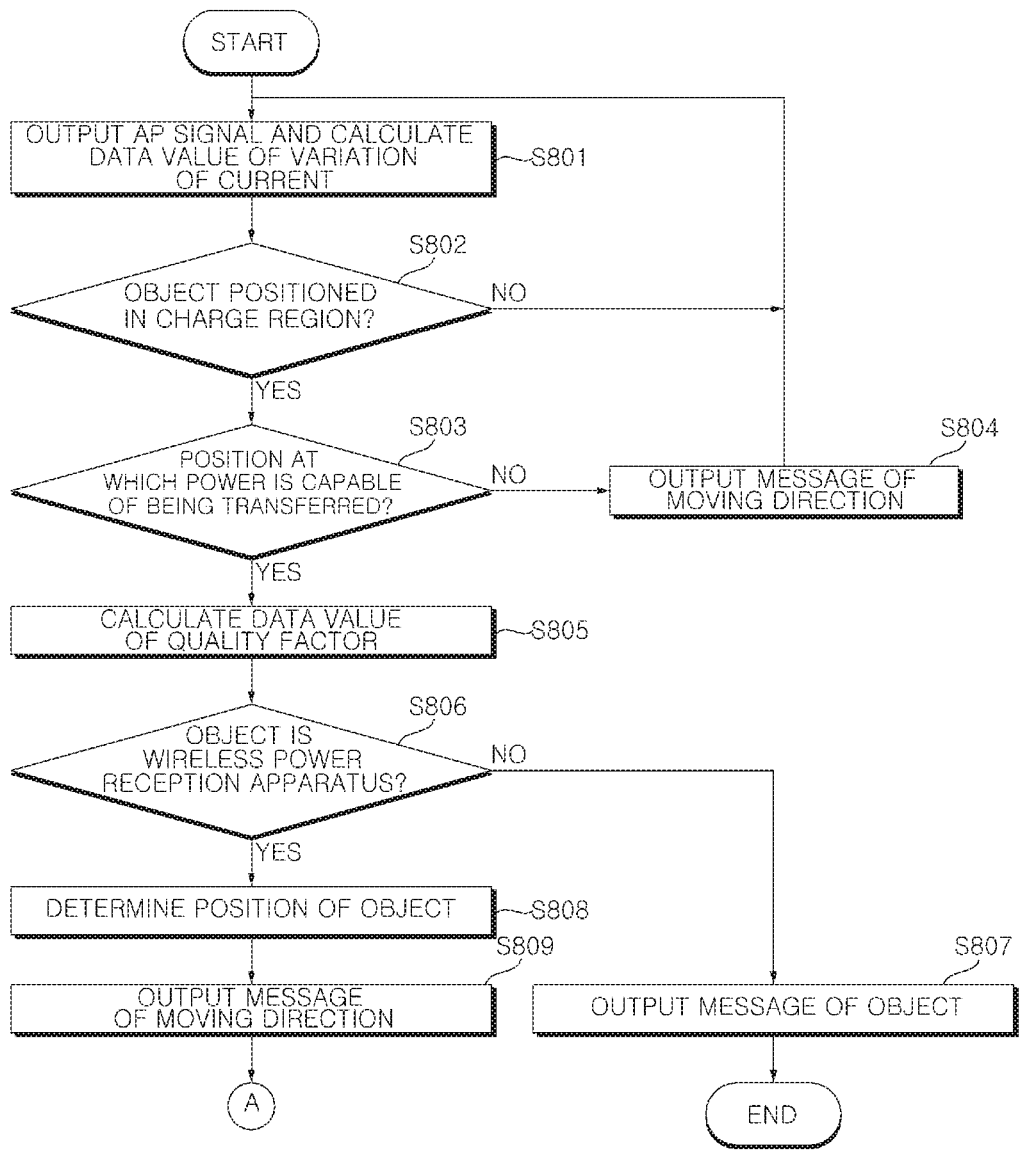
FIGS. 8A and 8B are flowcharts of a method of controlling a wireless power transfer apparatus according to an embodiment of the present disclosure.
Figure 8B:
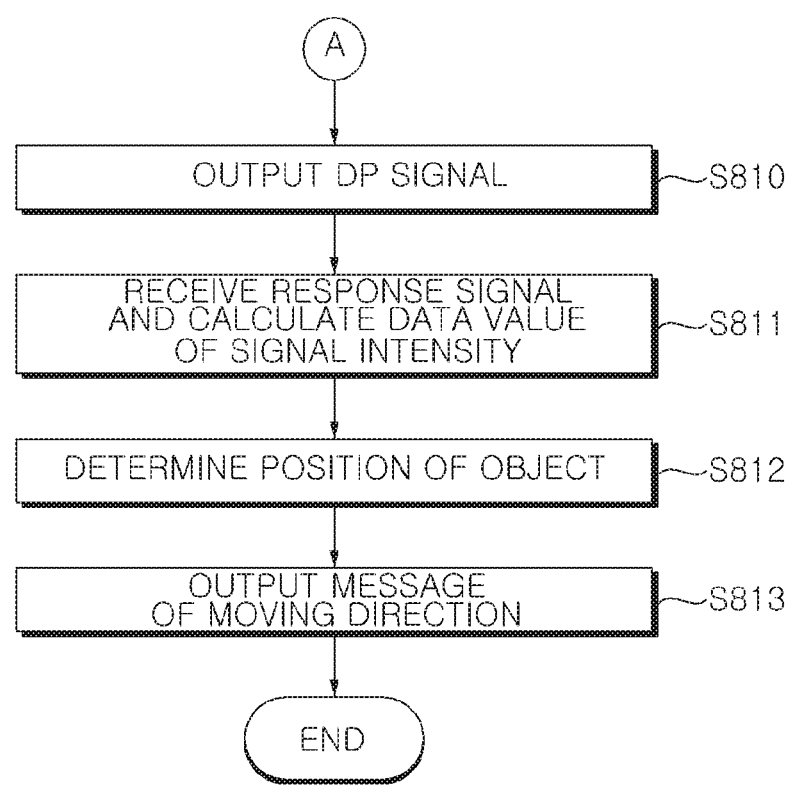

FIGS. 8A and 8B are flowcharts of a method of controlling a wireless power transfer apparatus according to an embodiment of the present disclosure.

Referring to FIG. 8A, in operation S801, the wireless power transfer apparatus 100 can output an analog ping (AP) signal and can calculate a variation of current of each of the plurality of coils 181 to 184 as a data value according to output of the analog ping (AP) signal.

In operation S802, the wireless power transfer apparatus 100 can determine whether an object is present in the charge region.

For example, the wireless power transfer apparatus 100 can compare the variation of current of each of the plurality of coils 181 to 184 calculated in operation S801 with the reference value related to the variation of current stored in the memory 120 and can determine whether an object is present in the charge region according to the comparison result.

For example, the wireless power transfer apparatus 100 can compare variations of current of the plurality of coils 181 to 184 calculated in operation S801 and can determine whether an object is present in the charge region according to the comparison result.

When determining that an object is not present in the charge region, the wireless power transfer apparatus 100 can proceed to operation S801 and can perform the same.

When determining that the object is present in the charge region, the wireless power transfer apparatus 100 can determine a position of an object in the charge region and can determine whether the object is positioned at a position at which power is capable of being transferred in operation S803.

For example, the wireless power transfer apparatus 100 can determine a position of an object in the charge region based on a comparison result obtained by comparing the variation of current of each of the plurality of coils 181 to 184 calculated in operation S801 with the variation of current stored in the memory 120 and can determine whether the object is positioned at a position at which power is capable of being transferred.

When the object is positioned at a position at which power is not capable of being transferred, the wireless power transfer apparatus 100 can output a message of a moving direction of the object through the output unit 150 in operation S804.

For example, the wireless power transfer apparatus 100 can determine a moving direction corresponding to the position of the object determined in operation based on data about a moving direction corresponding to the position of the object, stored in the memory 120, and can output a message about the determined moving direction.

For example, the wireless power transfer apparatus 100 can also output a message indicating that the object is positioned at a position at which power is not capable of being transferred.

When the object is positioned at a position at which power is capable of being transferred, the wireless power transfer apparatus 100 can calculate a quality factor Q of each of the plurality of coils 181 to 184 as a data value in operation S805.

For example, the wireless power transfer apparatus 100 can detect a voltage V1 applied to a coil and a capacitor and a voltage V2 applied to opposite ends of the coil and can calculate a quality factor Q of each of the plurality of coils 181 to 184 as a data value based on the detected voltages.

In operation S806, the wireless power transfer apparatus 100 can determine whether the object positioned in the charge region is the wireless power reception apparatus 200.

For example, the wireless power transfer apparatus 100 can compare the quality factor Q of each of the plurality of coils 181 to 184, calculated in operation S805, with a reference value related to the quality factor Q stored in the memory 120 and can determine whether the object positioned in the charge region is the wireless power reception apparatus 200 according to the comparison result.

When the object positioned in the charge region is not the wireless power reception apparatus 200, the wireless power transfer apparatus 100 can output a message about an object through the output unit 150 in operation S807.

For example, the wireless power transfer apparatus 100 can output a message indicating that the object positioned in the charge region is the foreign object FO through the output unit 150.

When the object positioned in the charge region is the wireless power reception apparatus 200, the wireless power transfer apparatus 100 can determine a position of the wireless power reception apparatus 200 in the charge region in operation S808.

For example, the wireless power transfer apparatus 100 can determine the position of the wireless power reception apparatus 200 in the charge region according to the comparison result in operation S806.

The wireless power transfer apparatus 100 can output a message of a moving direction of the wireless power reception apparatus 200 through the output unit 150 in operation S809.

For example, the wireless power transfer apparatus 100 can determine the moving direction corresponding to the position of the wireless power reception apparatus 200, determined in operation S809, based on data of a moving direction corresponding to a position of an object, stored in the memory 120, and can output a message of the determined moving direction.

Referring to FIG. 8B, the wireless power transfer apparatus 100 can output a digital ping (DP) signal for awaking the wireless power reception apparatus 200 in operation S810.

For example, the wireless power transfer apparatus 100 can output a digital ping (DP) signal to the wireless power reception apparatus 200 through the plurality of coils 181 to 184.

In operation S811, the wireless power transfer apparatus 100 can receive a response signal to the digital ping (DP) signal output from the wireless power reception apparatus 200 and can calculate signal intensity of the response signal.

For example, the wireless power transfer apparatus 100 can output a digital ping (DP) signal through the plurality of coils 181 to 184. In addition, for example, the wireless power transfer apparatus 100 can receive a response single to the digital ping (DP) signal through each of the plurality of coils 181 to 184 and can calculate signal intensity of the response signal to each of the plurality of coils 181 to 184.

In operation S812, the wireless power transfer apparatus 100 can determine the position of the wireless power reception apparatus 200 in the charge region.

For example, in operation S811, the wireless power transfer apparatus 100 can compare the signal intensity of the response signal, calculated for each of the plurality of coils 181 to 184, with a reference value related to the signal intensity of the response signal, stored in the memory 120, and can determine the position of the wireless power reception apparatus 200 in the charge region according to the comparison result.

In operation S813, the wireless power transfer apparatus 100 can output a message of a moving direction of the wireless power reception apparatus 200 through the output unit 150.

For example, the wireless power transfer apparatus 100 can determine a moving direction corresponding to the position of the wireless power reception apparatus 200, determined in operation S812, based on the data of the moving direction corresponding to the position of the object, stored in the memory 120, and can output a message of the determined moving direction.

Figure 9A:
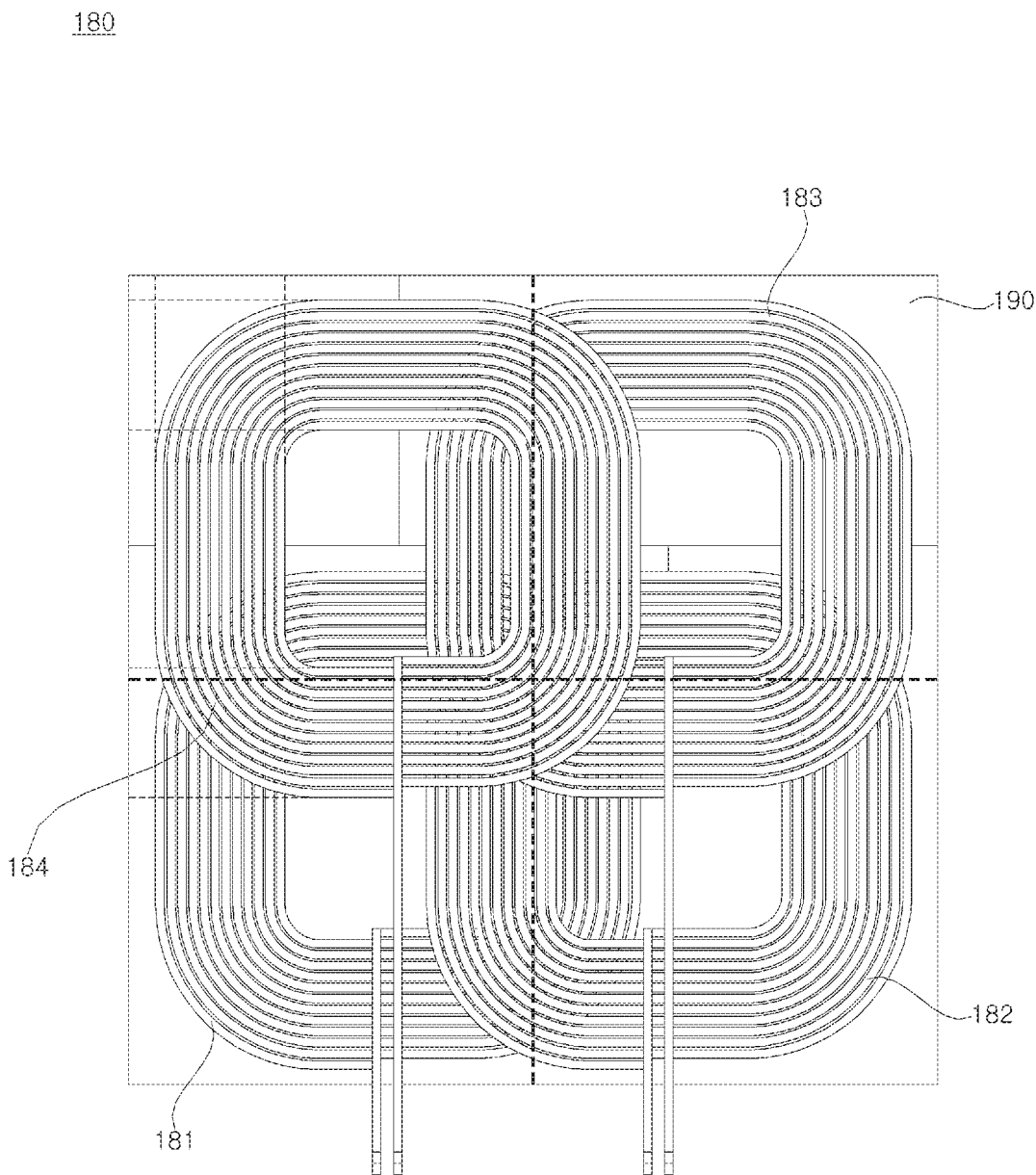
FIGS. 9A and 9B are diagrams illustrating a charge region of a wireless power transfer apparatus according to an embodiment of the present disclosure.
Figure 9B:
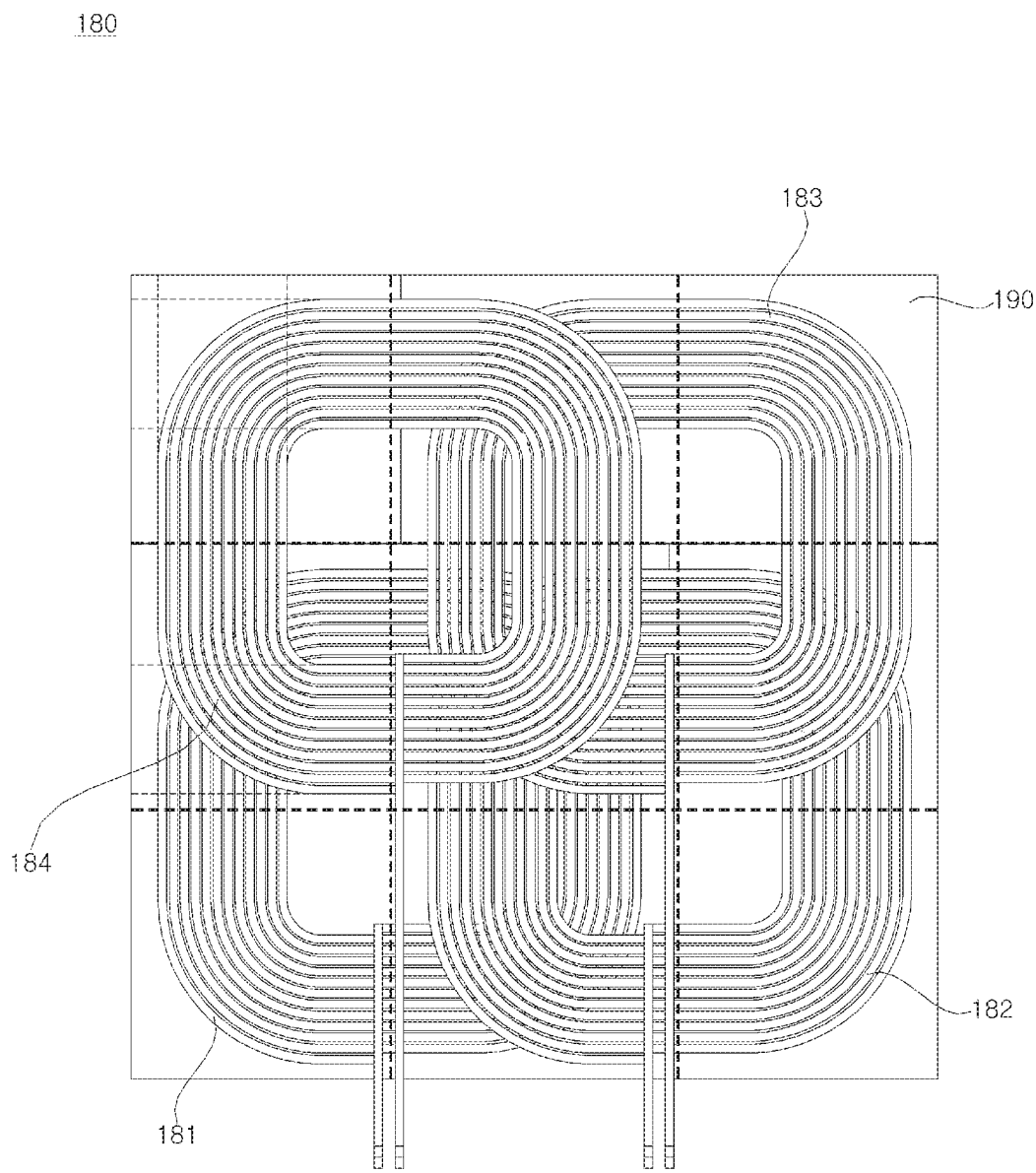

FIGS. 9A and 9B are diagrams illustrating a charge region of a wireless power transfer apparatus according to an embodiment of the present disclosure.

Referring to FIG. 9A, the power transmitter 180 can include the plurality of coils 181 to 184 and the shielding material 190. In this case, the charge region can be, for example, a region corresponding to the plurality of coils 181 to 184, in other words, a region corresponding to an area of the shielding material 190.

The charge region can be divided into, for example, a plurality of sub-regions. For example, as shown in FIG. 9A, the charge region can be classified into four sub-regions that include central parts of the plurality of coils 181 to 184, respectively.

A factory-calibrated data value stored in the memory 120 can be, for example, a factory-calibrated data value in relation to a position of the wireless power reception apparatus 200 with respect to the plurality of sub-regions.

Referring to FIG. 9B, the charge region can be divided into four sub-regions including only one of the plurality of coils 181 to 184, four sub-regions in which two of the plurality of coils 181 to 184 overlap each other, and one sub-region in which all of the plurality of coils 181 to 184 overlap each other.

However, the present disclosure is not limited to the examples shown in FIGS. 9A and 9B, and the charge region can be divided into sub-regions with various numbers and shapes.

Although FIGS. 9A and 9B illustrate the case in which the charge region is divided into a plurality of sub-regions and a factory-calibrated data value is stored in the memory 120 with respect to the plurality of sub-regions, the present disclosure is not limited thereto, and the factory-calibrated data value with respect to a plurality of coordinate values of the charge region can also be stored in the memory 120.

FIGS. 10A to 10E are diagrams for explaining an operation of a wireless power transfer apparatus according to an embodiment of the present disclosure.

Figure 10A:
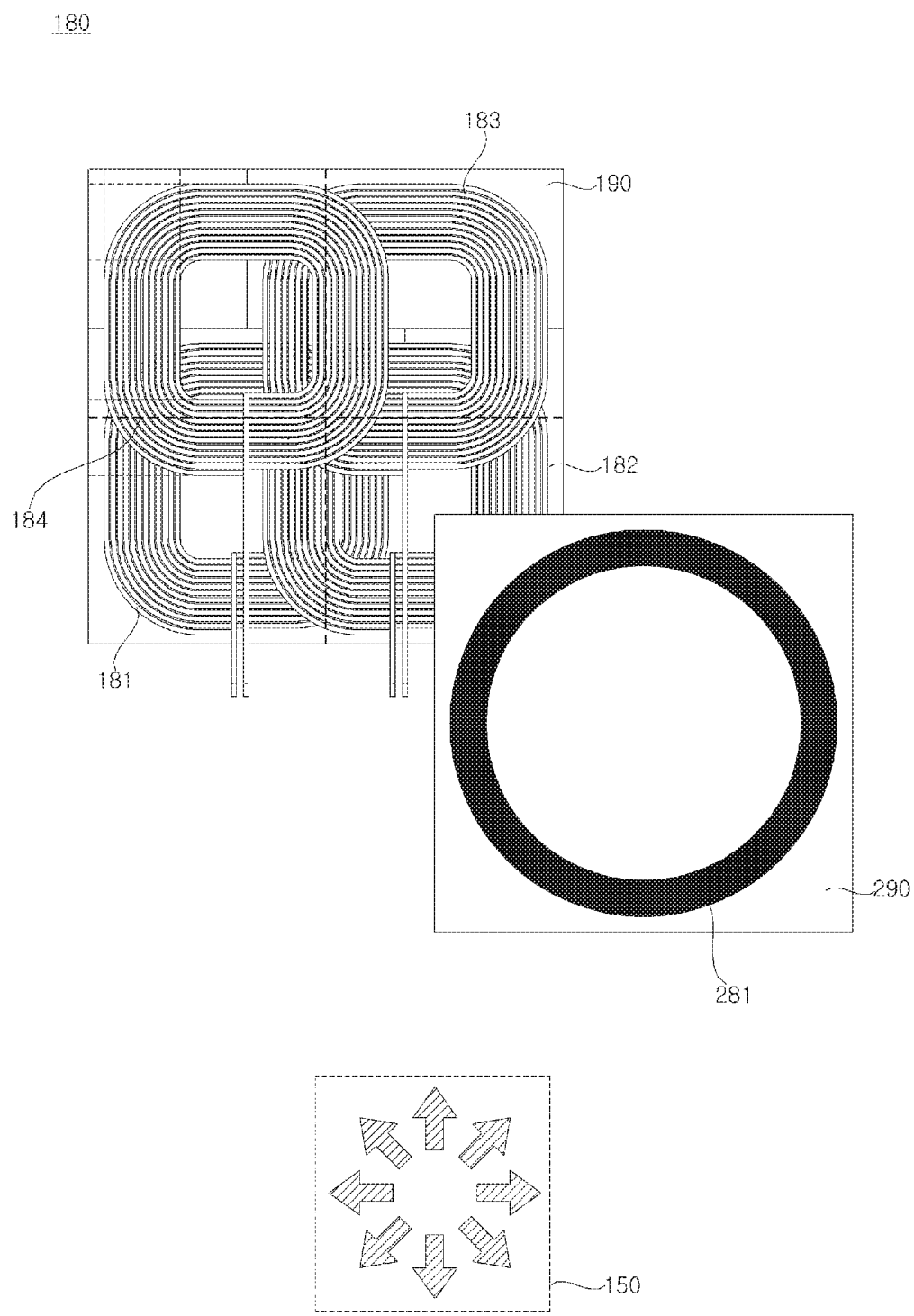
FIGS. 10A to 10E are diagrams for explaining an operation of a wireless power transfer apparatus according to an embodiment of the present disclosure.
Figure 10B:
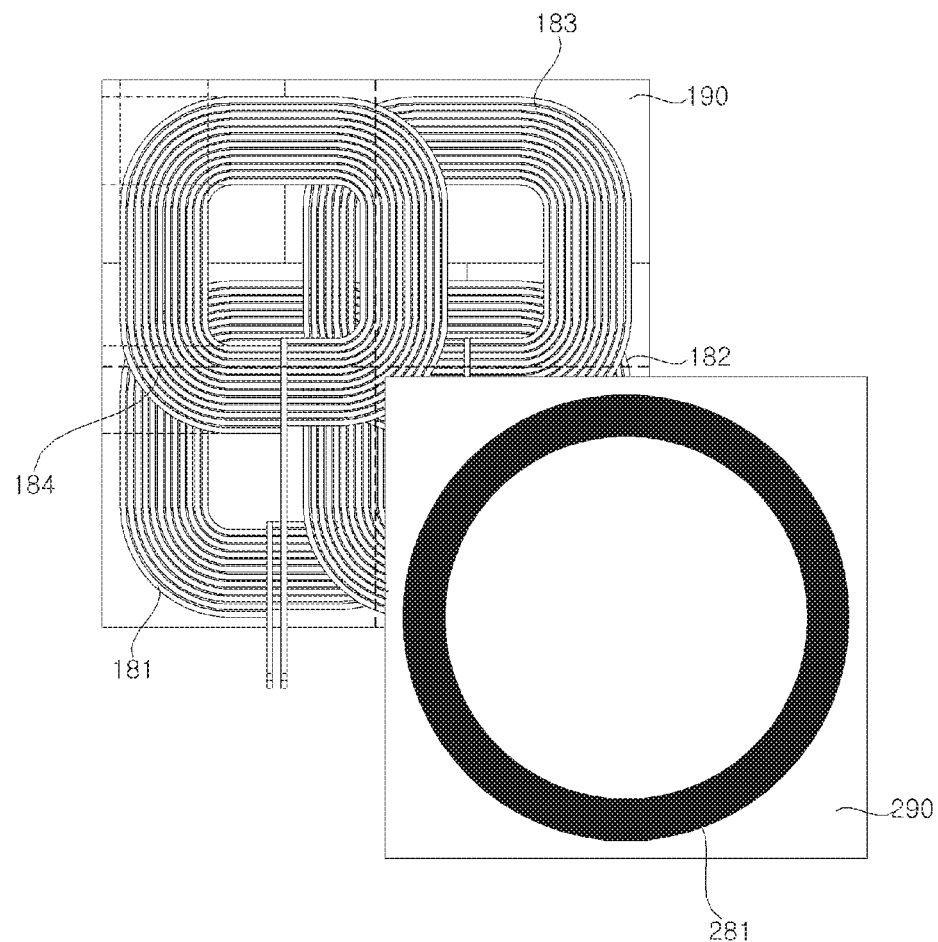
Figure 10B:
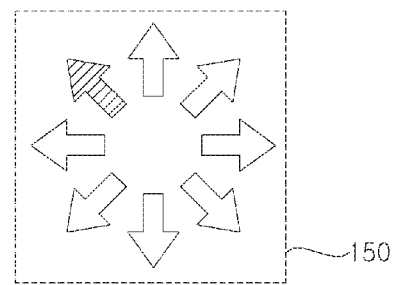

Referring to FIGS. 10A and 10B, the wireless power transfer apparatus 100 can output an analog ping (AP) signal through the plurality of coils 181 to 184 and can check that an object is positioned in a second sub-region corresponding to the second coil 182 in the charge region based on the variation of current of each of the plurality of coils 181 to 184 according to output of the analog ping (AP) signal.

For example, the wireless power transfer apparatus 100 can compare variation of currents of the first to fourth coils 181 to 184 and can check that a variation of current of the second coil 182 is larger than those in the remaining coils 181, 183, and 184, and thus can check that an object is positioned in a second sub-region corresponding to the second coil 182 in the charge region.

For example, the wireless power transfer apparatus 100 can compare a variation of current of the plurality of coils 181 to 184 with a reference value related to a preset variation of current and can check that only a variation of current of the second coil 182 is larger than the reference value, and thus can also check that an object is positioned in the second sub-region corresponding to the second coil 182 in the charge region.

When an object is positioned only in any one sub-region of the charge region, the wireless power transfer apparatus 100 can determine that an object is present in the charge region but is positioned at a position at which power is incapable of being transferred and can output a message through a light emitting diode (LED) included in the output unit 150.

As shown in FIG. 10A, a plurality of light emitting diodes (LEDs) included in the output unit 150 can be turned on or can blink a predetermined number of times, and thus can output a message indicating that an object is positioned at a position at which power is not capable of being transferred.

The wireless power transfer apparatus 100 can determine a moving direction of an object for transferring power and can output a message of the determined moving direction.

As shown in FIG. 10B, a top left light emitting diode (LED) corresponding to a moving direction among the plurality of LEDs included in the output unit 150 can be turned on or can blink, and thus can output a message of a moving direction toward a position with high power transfer efficiency.

Figure 10C:
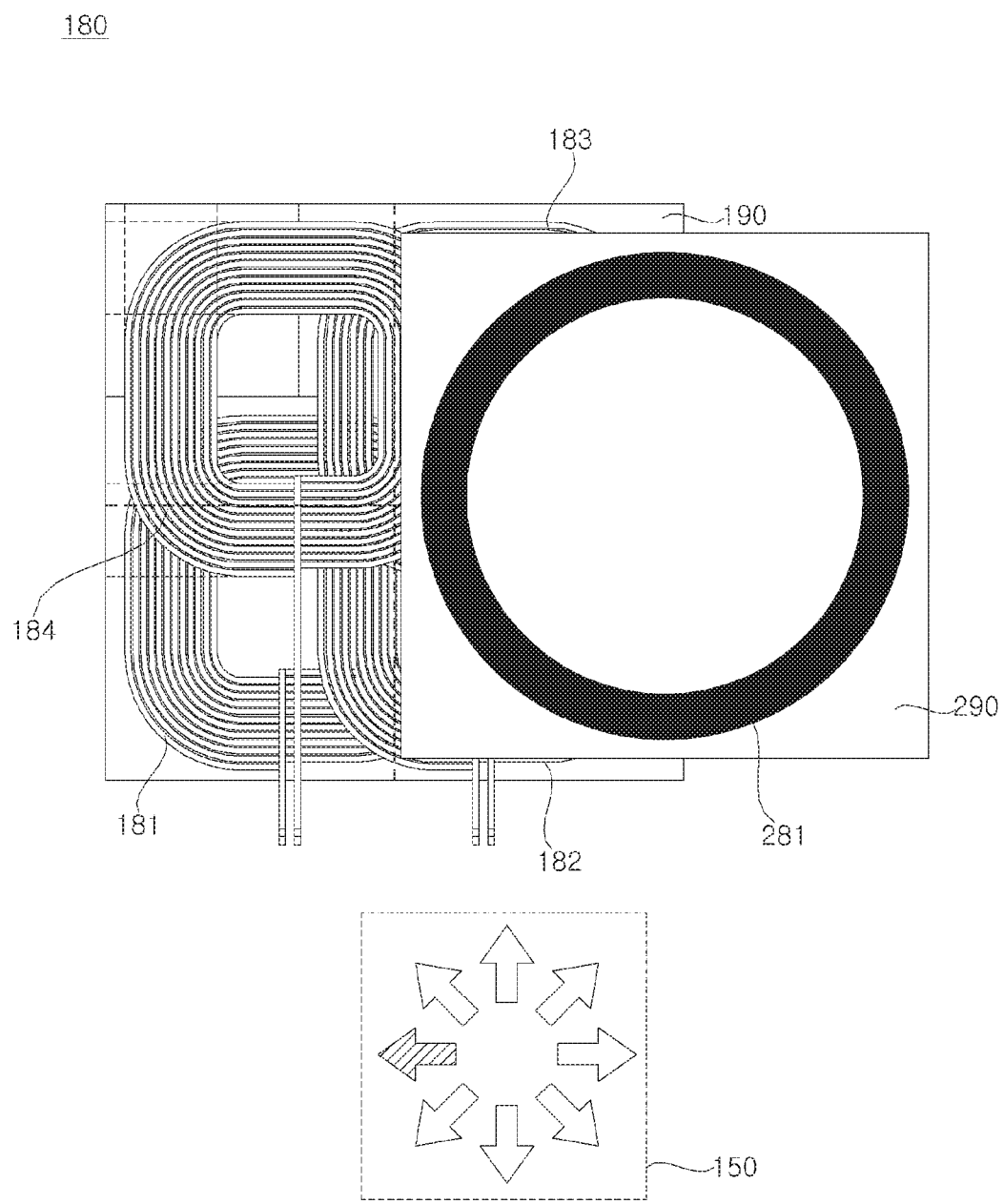
Figure 10D:
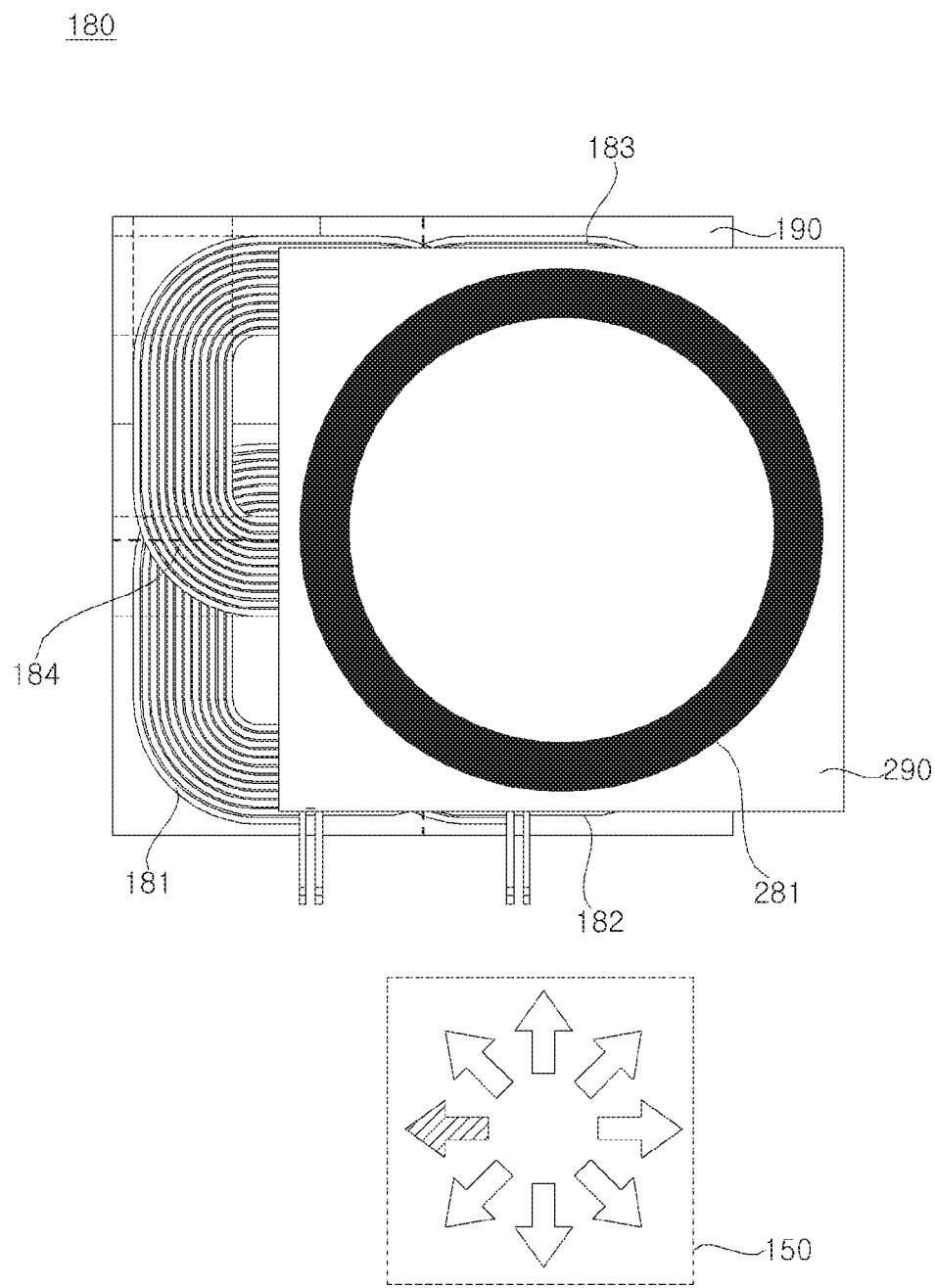

Referring to FIGS. 10C and 10D, when an object is positioned in second and third sub-regions corresponding to the second and third coils 182 and 183 in the charge region, the wireless power transfer apparatus 100 can determine that the object is present at a position at which power is capable of being transferred and can calculate a quality factor Q of each of the plurality of coils 181 to 184.

The wireless power transfer apparatus 100 can compare the quality factor Q of each of the plurality of coils 181 to 184 with a reference value related to the quality factor Q, stored in the memory 120, can determine that an object is the wireless power reception apparatus 200 including the reception coil 281 and a shielding material 290 according to the comparison result, and can determine a position of the wireless power reception apparatus 200 in the charge region.

When the object position in the charge region is the wireless power reception apparatus 200, the wireless power transfer apparatus 100 can output a digital ping (DP) signal through the plurality of coils 181 to 184 and can receive a response single to the digital ping (DP) signal through each of the plurality of coils 181 to 184.

The wireless power transfer apparatus 100 can compare signal intensity of a response signal, calculated for each of the plurality of coils 181 to 184, with a reference value related to signal intensity of the response signal, stored in the memory 120, and can determine a position of the wireless power reception apparatus 200 in the charge region according to the comparison result.

The wireless power transfer apparatus 100 can output a message of a moving direction toward a position with high power transfer efficiency. For example, a left light emitting diode (LED) corresponding to a moving direction among the plurality of LEDs included in the output unit 150 can be turned on or can blink, and thus can output a message of a moving direction.

The wireless power transfer apparatus 100 can also output a message of a moving distance along with the message of the moving direction toward the position with high power transfer efficiency.

For example, the wireless power transfer apparatus 100 can output a message of a moving distance to a position with high power transfer efficiency from the current position of the wireless power reception apparatus 200 based on the data of the moving distance corresponding to the quality factor Q of the plurality of coils 181 to 184, stored in the memory 120, and /or data of a moving distance corresponding to signal intensity of the response signal In the case of FIG. 10C, the wireless power reception apparatus 200 is positioned only in the second and third sub-regions, and thus the wireless power transfer apparatus 100 can output a message of a first moving distance (e.g., 20 cm).

In contrast, in the case of FIG. 10D, the wireless power reception apparatus 200 is positioned in a portion of the first and fourth sub-regions as well as the second and third sub-regions, and thus the wireless power transfer apparatus 100 can output a message of a second moving distance (e.g., 10 cm).

In this case, the wireless power transfer apparatus 100 can output a message of a moving distance through, for example, a display and/or a speaker included in the output unit 150.

Figure 10E:
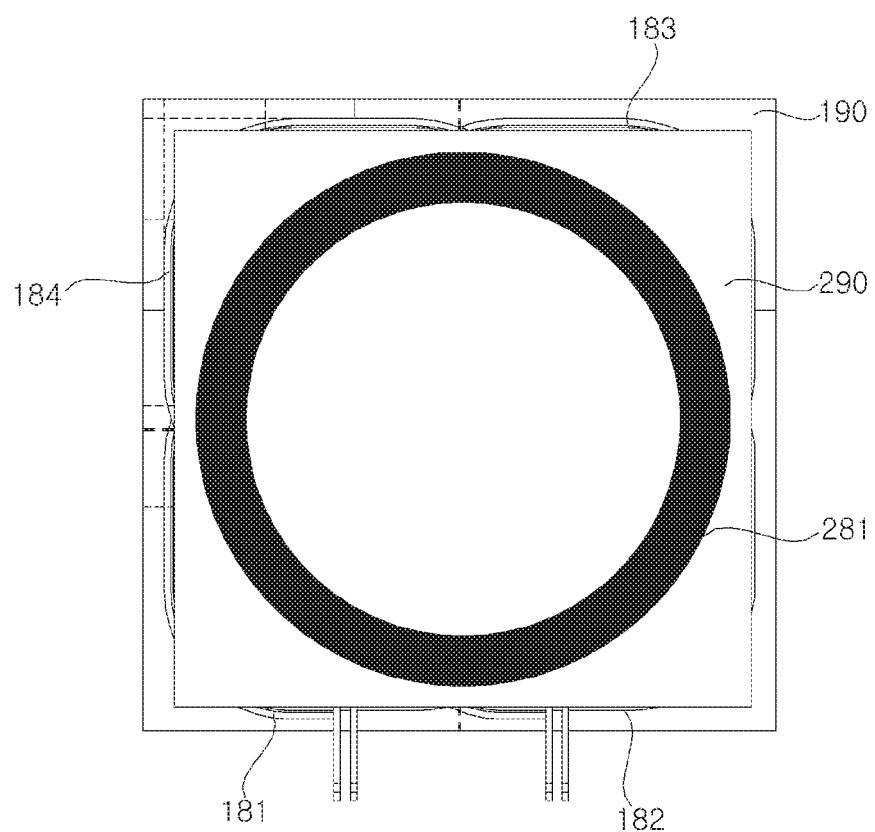
Figure 10E:
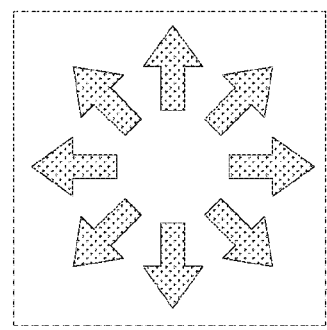

Referring to FIG. 10E, the wireless power reception apparatus 200 can be checked to be positioned in an entire charge region with high power transfer efficiency.

In this case, the wireless power transfer apparatus 100 can turn on or blink a plurality of light emitting diodes (LEDs) included in the output unit 150, and thus can output a message indicating that the wireless power reception apparatus 200 is positioned at a position with high power transfer efficiency.

Color (e.g., red) of a plurality of light emitting diodes that are turned on or blink when an object is present at a position at which power is not capable of being transferred in FIG. 10A and color (e.g., green) of a plurality of light emitting diodes that are turned on or blink when the wireless power reception apparatus 200 is positioned at a position with high power transfer efficiency in FIG. 10E can be different from each other.

As described above, according to various embodiments of the present disclosure, a position of an object positioned in a charge region can be accurately determined using a data value of the plurality of coils 181 to 184 included in the wireless power transfer apparatus 100 but not a single coil, and information on a moving direction and/or a moving distance to a position with high charging efficiency can be intuitively provided to a user.

According to various embodiment of the present disclosure, a data value of a multi coil but not a single coil can be used, and thus, a position of an object that is a target of wireless power transfer in a charge region can be more accurately determined.

According to various embodiment of the present disclosure, a position of an object that is a target of wireless power transfer can be determined using a multi coil used for power transfer, and thus, a separate component for determining the position of the object is not required, thereby reducing manufacturing costs.

According to various embodiment of the present disclosure, a position of an object that is a target of wireless power transfer can be determined for each operation for wireless power transfer, and thus, the position of the object can be more accurately determined.

In addition, according to various embodiment of the present disclosure, when it is required to move an object that is a target of wireless power transfer to a position with high power transfer efficiency, a message of a moving direction and/or a moving distance can be intuitively provided to a user.

The present disclosure can also be embodied as processor readable code on a processor readable recording medium included in an electronic device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium can be distributed to computer systems connected through a network, stored and executed as code readable in a distributed manner The features of the present disclosure will be more clearly understood from the accompanying drawings and should not be limited by the accompanying drawings, and it is to be appreciated that all changes, equivalents, and substitutes that do not depart from the spirit and technical scope of the present disclosure are encompassed in the present disclosure.

Similarly, although operations are described in a specific order in the drawings, it is not understood that these operations need to performed in the specific order or in a sequential order in order to acquire a suitable result and that all operations illustrated in the drawings need to be performed. In a specific case, multitasking and parallel processing can be more suitable.

Although the exemplary embodiments of the present disclosure have been disclosed for illustrative purposes, those skilled in the art will appreciate that various modifications, additions and substitutions are possible, without departing from the scope and spirit of the embodiments as disclosed in the accompanying claims.

What is claimed is:

1. A wireless power transfer apparatus comprising:
a power transmitter including a plurality of coils and configured to transfer power through the plurality of coils; and
a controller,
wherein the controller is configured to:
output an analog ping signal through the plurality of coils,
calculate a variation of current flowing in each of the plurality of coils according to the output of the analog ping signal,
primarily determine a position of an object in a charge region associated with the plurality of coils based on a comparison result obtained by comparing a data value of the calculated variation of the current with a preset first reference value,
calculate a quality factor of each of the plurality of coils when the object is positioned in the charge region,
determine whether the object is a wireless power reception apparatus that is a target of wireless power transfer, based on a. data. value of the calculated quality factor,
secondarily determine the position of the object based on a comparison result obtained by comparing the data value of the calculated quality factor with a preset second reference value, output a digital ping signal through the plurality of coils when the object is determined to be the wireless power reception apparatus,
when a response signal to the digital ping signal is received from the wireless power reception apparatus, calculate a signal intensity of the response signal for each of the plurality of coils, and
thirdly determine the position of the object based on a comparison result obtained by comparing a data value of the calculated signal intensity with a preset third reference value,
wherein the charge region associated with the plurality of coils includes a plurality of sub-regions, and
wherein the controller is configured to determine that the position of the object corresponds to a position at which power is incapable of being transferred, when the position of the object corresponds to only one of the plurality of sub-regions.

2. The wireless power transfer apparatus of claim 1, wherein the controller is configured to determine a moving direction of the object with respect to the current position of the object according to a preset reference, when the object is currently positioned in the charge region,
the determined moving direction representing a direction in which the object can be moved to receive wireless power transfer from the wireless power transfer apparatus.

3. The wireless power transfer apparatus of claim 2, further comprising an output unit including at least one of a display and a speaker,
wherein the controller is configured to output a message of the determined moving direction through the output unit.

4. The wireless power transfer apparatus of claim 2, further comprising a communication circuit,
wherein the controller configured to transmit a signal including data of the determined moving direction to the wireless power reception apparatus through the communication circuit.

5. The wireless power transfer apparatus of claim 1, wherein the controller is further configured to determine that the position of the object corresponds to a position at which power is capable of being transferred, when the position of the object corresponds to at least two or more of the plurality of sub-regions.

6. A method of controlling a wireless power transfer apparatus including a plurality of coils, the method comprising:
outputting an analog ping signal through the plurality of coils;
calculating a variation of current flowing in each of the plurality of coils according to the output of the analog ping signal;
primarily determining a position of an object in a charge region associated with the plurality of coils based on a comparison result obtained by comparing a data value of the calculated variation of the current with a preset first reference value;

calculating a quality factor of each of the plurality of coils when the object is positioned in the charge region;

determining whether the object is a wireless power reception apparatus that is a target of wireless power transfer, based on a data value of the calculated quality factor;

secondarily determining the position of the object based on a comparison result obtained by comparing the data value of the calculated quality factor with a preset second reference value;

outputting a digital ping signal through the plurality of coils when the object is determined to be the wireless power reception apparatus;

when a response signal to the digital ping signal is received from the wireless power reception apparatus, calculating a signal intensity of the response signal for each of the plurality of coils; and thirdly determining the position of the object based on a comparison result obtained by comparing a data value of the calculated signal intensity with a preset third reference value, wherein the charge region associated with the plurality of coils includes a plurality of sub- regions, and wherein the method further comprises determining that the position of the object corresponds to a position at which power is incapable of being transferred when the position of the object corresponds to only one of the plurality of sub-regions.

7. The method of claim 6, further comprising determining a moving direction of the object with respect to the current position of the object according to a preset reference, when the object is currently positioned in the charge region, the determined moving direction representing a direction in which the object can be moved to receive wireless power transfer from the wireless power transfer apparatus.

8. The method of claim 7, further comprising outputting a message of the determined moving direction through an output unit of the wireless power transfer apparatus, the output unit including at least one of a display and a speaker.

9. The method of claim 7, further comprising transmitting a signal including data of the determined moving direction to a wireless power reception apparatus through a communication circuit of the wireless power transfer apparatus.

10. The method of claim 6, wherein the method further comprises determining that the position of the object corresponds to a position at which power is capable of being transferred, when the position of the object corresponds to at least two or more of the plurality of sub-regions.

11. A wireless power transfer apparatus comprising:

a power transmitter including a plurality of coils and configured to transfer power through the plurality of coils; and a controller, wherein the controller is configured to:

calculate one or more data values for at least some of the plurality of coils, compare the calculated one or more data values to one or more preset reference values to obtain a comparison result, and determine a position of an object in a charge region associated with the plurality of coils based on the comparison result, wherein the charge region associated with the plurality of coils includes a plurality of sub- regions, and wherein the controller is configured to determine that the position of the object corresponds to a position at which power is incapable of being transferred, when the position of the object corresponds to only one of the plurality of sub-regions.

* * * * *